(12) United States Patent
Wanderer

(10) Patent No.: US 11,531,214 B1
(45) Date of Patent: Dec. 20, 2022

(54) EYEGLASSES ACCESSORY FOR EYEGLASSES RETENTION AND ASSOCIATED METHODS

(71) Applicant: Alan Wanderer, Bozeman, MT (US)

(72) Inventor: Alan Wanderer, Bozeman, MT (US)

(73) Assignee: HUGGOPTIX LLC, Bozeman, MT (US)

( * ) Notice: Subject to any disclaimer, the term of this patent is extended or adjusted under 35 U.S.C. 154(b) by 0 days.

(21) Appl. No.: 17/653,362

(22) Filed: Mar. 3, 2022

Related U.S. Application Data

(63) Continuation-in-part of application No. 17/451,585, filed on Oct. 20, 2021.

(51) Int. Cl.
 *G02C 3/00* (2006.01)
 *H04R 25/00* (2006.01)
 *G02C 5/14* (2006.01)

(52) U.S. Cl.
 CPC ............ *G02C 3/003* (2013.01); *G02C 3/006* (2013.01); *G02C 5/143* (2013.01); *H04R 25/65* (2013.01); *G02C 2200/20* (2013.01); *H04R 2225/021* (2013.01)

(58) Field of Classification Search
 CPC ........ G02C 3/003; G02C 3/006; G02C 5/143; G02C 2200/20; G02C 11/06; H04R 25/65; H04R 25/607; H04R 2225/021
 See application file for complete search history.

(56) References Cited

U.S. PATENT DOCUMENTS

| | | | | |
|---|---|---|---|---|
| 4,479,703 A * | 10/1984 | Enghofer | ............... | G02C 5/143 351/123 |
| 4,657,364 A * | 4/1987 | Murrell | .................. | G02C 3/003 351/123 |
| 4,696,556 A * | 9/1987 | Perry, III | ............... | G02C 3/003 351/123 |
| 5,002,381 A * | 3/1991 | Murrell | .................... | G02C 5/00 351/123 |
| 5,673,094 A * | 9/1997 | Bahouth | ................ | G02C 3/003 351/43 |
| 6,511,176 B2 * | 1/2003 | Kliot | ...................... | G02C 3/003 351/156 |
| 8,820,921 B1 * | 9/2014 | Lier | .......................... | G02C 5/20 351/123 |

(Continued)

*Primary Examiner* — Oyesola C Ojo
(74) *Attorney, Agent, or Firm* — Collaborative IP; Paul J Ditmyer

(57) ABSTRACT

An accessory eyeglasses retention device is integrally formed as a single elastomeric piece to secure eyeglasses to a wearer's head. The accessory eyeglasses retention device may include an elongated body extending between a front end and a back end, an adjustment mechanism including a first elastic strap and a second elastic strap, for example, longitudinally spaced apart on the elongated body and configured to hold a temple of the eyeglasses and adjustably position the elongated body relative to the temple. An angled flap is at the back end of the elongated body, extending and angled in a direction towards a portion of the wearer's head when the eyeglasses are worn on the wearer's head, and configured to securely retain the eyeglasses in a desired location on the wearer's head. Also, a lanyard attachment feature may be included at the back end of the elongated body and configured to attach the elongated body to an eyeglasses lanyard.

20 Claims, 14 Drawing Sheets

(56) References Cited

U.S. PATENT DOCUMENTS

| | | | | |
|---|---|---|---|---|
| 9,329,403 | B2* | 5/2016 | Lenz | A61F 9/027 |
| 10,986,452 | B1* | 4/2021 | Hilvers | H04R 25/60 |
| 2001/0010727 | A1* | 8/2001 | Urwyler | H04R 1/1033 |
| | | | | 381/384 |
| 2007/0253586 | A1* | 11/2007 | Fickweiler | G02C 11/06 |
| | | | | 381/330 |
| 2008/0309869 | A1* | 12/2008 | Chen | G02C 5/143 |
| | | | | 351/155 |
| 2013/0077043 | A1* | 3/2013 | Moran | G02C 11/00 |
| | | | | 351/111 |
| 2014/0354939 | A1* | 12/2014 | Walicki | G02C 3/003 |
| | | | | 351/155 |
| 2017/0168316 | A1* | 6/2017 | Loo | G02C 11/08 |

* cited by examiner

EYEGLASSES ACCESSORY FOR EYEGLASSES RETENTION AND ASSOCIATED METHODS

CROSS REFERENCE TO RELATED APPLICATIONS

This application is a Continuation-In-Part (CIP) of, and claims priority under 35 U.S.C. § 119 to, application U.S. Ser. No. 17/451,585, filed Oct. 10, 2021 which in turn claims priority to provisional patent application U.S. Ser. No. 63/202,893, filed Jun. 29, 2021. The priority patent applications are herein incorporated by reference in their entirety, including without limitation, the specification, claims, and abstract, as well as any figures, tables, appendices, or drawings thereof.

FIELD OF THE INVENTION

The present inventions relate generally to an accessory device for eyeglasses that can function to retain and stabilize eyeglasses and/or hearing aids in place.

BACKGROUND

The most common hearing aid is the behind the ear type (BTE) referred to as the receiver in the ear (RITE), also known as receiver in the ear canal (RIC), in which the microphone, amplifier and electronic components are located in the hearing aid housing behind the ear and the receiver/speaker is in an ear dome situated in the ear canal. BTE will be used in this application as a generic term to include RITE and RIC nomenclature. BTE when mentioned in this patent application includes all BTE hearing aids and CIP (cochlear implant processor). Inside the ear ("ITE") hearing aids are comprised of all the components described above compartmentalized in a device inserted into the ear canal and are not included for this invention.

BTE hearing aids can be dislodged and fall off and out of a user's ear spontaneously or during physical activity. They are quite expensive to replace so there is a need to ensure their retention. There are many marketed devices designed to retain hearing aids in place. Some are comprised of cords with means to attach to the housing of a BTE hearing aid and the other end clipped to a user's clothing (e.g., collar). An example of this type of retainer are tethers with a loop at one end that encircle the housing and an alligator clip at the other end of a cord which attaches to the user's clothing, as shown in "Oticon SafeLine hearing aid retention cord." Another company Vivtone has a similar product seen at URL: https://vivtone.com/collections/new-collection. Accidental stretching of the tether can potentially pull and dislodge the housing or speaker out of position and potentially harm the user's auditory canal or even damage the BTE hearing aid. There are retainers for children comprised of headbands that are attached to silicone sleeves that surround the hearing aid housing. The problem with this retainer design is movement of the headband may pull on the housing and/or the ear buds causing a hearing aid to dislodge out of the user's ear, especially during physical activity. Another disadvantage includes difficulty to contact volume buttons and the potential for the sleeve to cover microphone ports, thereby interfering in sound reception.

Another product comprises a chain attached to a hearing aid and then to an earring, described in U.S. Pat. No. 5,327,499. Obvious injury to an ear can occur if there is stretching of the chain attached to the earring. Other inventions include skid proof surfaces on sides of housings of hearing aids in U.S. Pat. No. 7,684,581. This has the inherent likelihood not retaining the housing of a BTE hearing aid in place as a result of head and body movement, such as during strenuous physical activities with sweating that will reduce friction between contact of the skid proof surfaces on sides of holders of hearing aids and the skin of the user. "Huggie Aids" described in U.S. Pat. No. 4,702,345 are comprised of flexible rings and bands attached to hearing aids which then encircle the pinnae. This device also can be dislodged by strenuous physical action. Still another invention includes adhesive tapes comprised of 3M double stick contour tape which are stuck on the hearing aid housing and then to the sides of the user's head. This has inherent problems such as the recurring cost of purchasing disposable tapes and potential dislodgement of the BTE housing if the tapes separate from the user's head. Similarly, retainers for CIP (cochlear implant processors) involve tethers with sleeves covering the CIP and tethers with clips to clothing or to head bands capturing the CIP. These have inherent disadvantages as previously described for tethers and clips. Most hearing aid retention devices have the distinct disadvantage of requiring customized multiple components that need to be individualized for users and for hearing aids made by different manufacturers. Another hearing aid accessory for hearing aid retention is shown in U.S. Pre-grant Publication No. 2013/0121519. The structure adds a string attached to a housing to form a ring around the user's ears. This requires an accessory addition to the housing which adds more manufacturing cost of BTE hearing aids and would not be universal for BTE hearing aid housings made by other manufacturers. The accessory string potentially can move around the auricle unless tightened which in turn could create uncomfortable pressure on the user's auricle. U.S. Pre-grant Pub. No. 2002/0029438 shows a device comprised of cloth loops that engage the housings, and the loops are in turn attached to an adjustable strap positioned around the user's head. Conceptually the housings are held close to the user's head. It has several design issues. First, the speaker inserted inside the ear canal can be forced out of its position by the tension of the strap on the housings and in turn move the housings out of place, and secondly up and down movement of the head strap could move the housings out of place.

The problem of hearing aid retention of the BTE type is compounded when wearing eyeglasses as there is a small anatomical space for both. Consequently, the hearing aid housing can be displaced off the ear when wearing eyeglasses. A commercial product called "Loopum Hearing Aid Retainer" is comprised of a flexible transparent loop that connects the hearing aid to the temple of eyeglasses. U.S. Pat. No. 8,848,959 illustrates a hook and loop fastener attached to the housing of a BTE hearing aid. There is a filament connected to one of the hook and loop tapes and it in turn terminates in a securing plate that connects to the temples of eyeglasses. This device for hearing aid retention has several undesirable design issues. The securing plate with a string attached to the second part of the hook or loop has to be added onto the temples and then the user connects the second part of the hook and loop to the housing. When the user starts to place the temples on their ears, this maneuver could pull the housings off the user's ears. As the eyeglasses are removed the hook and loop tapes tied to the eyeglasses can also inadvertently remove the housings off the user's ears There is also the issue that the hook and loop tapes can cover the microphone ports and interfere in hearing reception.

Compounding the issue of wearing hearing aids today is the need to wear masks because of the covid-19 pandemic or any future endemic/pandemic. Hearing aid users frequently experience housings falling off their pinnae as they remove the mask straps. The narrow space on top of the pinnae when wearing a hearing aid and mask straps is further compromised when a user must add eyeglasses.

There is a need for an engineered product that allows a user to retain hearing aids and eyeglasses in place as well as be able to wear a mask simultaneously. There are commercial products called "Ear Savers Face Mask for Glasses" that are round disc like wheels that can be added to temples of eyeglasses and then ties of a mask can attach to them. They do not however address the issue of hearing aid and eyeglasses retention.

For the purpose of this application eyeglasses refer to all eyewear that include the following classes but not limited to those listed, such as: eyeglasses for clear vision; for corrected vision; readers; sunglasses; and safety eyeglasses. There are several types of eyeglass retainers. One type uses straps or similar attachment means worn around the user's neck with ends of straps attached to ends of the eyeglass temples, referred to as 'around the neck eyeglass retainers' or commonly lanyards. These devices generally do not maintain eyeglasses from slipping down a user's nose but instead when eyeglasses dislodge from a user, they hold onto them from being lost or damaged. Well-known companies such as Croakies® and Chums® market these devices. Another lanyard called Adjustable Orbiter is manufactured by Chums and is an adjustable cable that slips on the temples and can adjust to the back of a user's head for eyeglass retention. It can be used loosely around the neck of the user to retain eyewear from falling away or tightened to the user's head so that eyewear remains located on the user's nose and ears. The device is not designed to retain hearing aids or masks.

A different category exemplified by Markwort® is a device comprised of an adjustable elastic band attached to ends of temples that fit snugly around the user's head and keep glasses from slipping down the user's nose and also retain them should they become dislodged. Another category involves devices attached to eyeglasses temples for maintaining eyeglasses from slipping down a user's nose, but they do not hold onto eyeglasses if they are dislodged. There are several examples of these devices with different shapes, such as a product with plastic hooks called "Stay Puts" with an inferior orientation that slide on eyeglasses temples behind the user's ear to keep eyeglasses from moving off the user's nose. U.S. Pat. No. 6,450,640 shows a similar device that is positioned behind the ears. This device(s) has only one point attachment allowing it to not fix firmly on the temples reducing its function for eyeglasses retention. A commercially available product named Wedgees Eyeglass Retainer is an elastomeric longitudinal device with a cavity that allows the user to slip them onto the temples of eyeglasses. They interface between the eyeglass temple and the side of the user's head. They don't have a posterior boundary so if they move back on the temples there is no posterior boundary to prevent the eyeglasses from slipping forward on a user's nose. Another example in U.S. Pat. No. 9,140,906 is comprised of neoprene adjustable multi-radius mounds located on ends of temples that maintain eyeglasses from slipping down a user's nose. They also do not have a posterior boundary, such that if the device moves back on the temples, there is no posterior boundary to prevent the eyeglasses from moving forward on a user's nose.

U.S. Pat. No. 5,120,119 shows another device using a pad that is attached integrally to the eyeglass temples (e.g. FIGS. 28, 33 therein) that can pivot onto the head of a user to retain the eyeglasses. The limitation of this device is that the pad appears to be in constant contact with the user's head. The device pad does not allow separation from the user's head, having no adjustability for the user to place the pad posterior to the head to obtain optimal positioning to allow space so that eyeglasses do not squeeze on the user's face. U.S. Pat. No. 3,957,361 shows a spring-loaded structure attached to temples with end loops, such that when eyeglasses with the spring-loaded device is placed on the user's head, the forces of the springs hold the eyeglasses in place by constant anterior spring pressure of loops against the user's head. Furthermore, without removing the eyeglasses, there is no structure to allow adjustability by the user once eyeglasses with the spring-loaded device clamped on the temples is placed on the user's head. Additionally, the spring-loaded elements have to be fashioned for different sizes of eyeglass temples. U.S. Pat. No. 7,441,891 shows an eyeglass accessory for eyeglasses retention (e.g. FIG. 1, element 16 therein). The device has limited adjustability as the retaining arm 22 cannot be moved anteriorly on the temple once its temple arm 18 is attached to the end of the temple. In addition, the device can have a constricting orifice 57 (e.g. FIG. 9 therein) that attaches the temple end onto the device which limits anterior movement of the retaining arm 22 on the temple. This then prevents the user from moving the device anterior of its fixation on the temple to obtain optimal positioning on the user's nose.

DE 102011008966 is an invention to permit eyeglasses to be worn around the user's neck. It has multipart structure to extend the temples using a spring 6 that permits the temples to torque inward to an obtuse angle greater than 90 degrees to permit the eyeglasses to hang around the user's neck. Another structure with a similar purpose to allow eyeglasses to hang around a user's neck is U.S. Pat. No. 11,009,720 B2 referred to as Eyeglasses with Extensions. These extensions have a cavity for attachment onto temple tips. The retainers have closed ends preventing the user from adjusting the devices posteriorly. Not having an open end precludes the user from moving the device posteriorly on the temples to obtain optimal eyeglass retention or for user comfort if needed, nor does it allow the user to move the device posteriorly if needed to move the eyeglasses from being too tight on the user's nose and face. There is a rigid segment inclined with respect to the first segment by an angle fixed between 110° and 160° that allows the extensions to be retained around the neck of the eyeglass user. These angles are fixed to be too obtuse and don't permit more acute angles for retention around the head of the user. WO 2013/110834 AI demonstrates another structure for eyeglasses to be retained around the neck of a user. The retaining means are formed by sidepieces of the eyeglasses comprising sections that can slide in relation to one another, such that each sidepiece can be extended to medial curve in order to retain the eyeglasses on the user's neck. Its structure contains extensions of the temples and as such contains multiple parts for the retainer structure.

GB 2448797 shows a variety of accessories added to eyeglass temples with the purpose of counterbalancing the eyeglasses to reduce unbalanced pressure on the nose and face of eyeglass users. The devices require multiple parts, some with hinges, some with a cup or box to couple and cover over the temples. Mostly the devices are not engineered to be a single unit with adjustability.

D 857090 show eyeglasses with distal temple ends that have a medial orientation. These eyeglasses may have an inherent designed eyeglass retainer but there is no means to adjust these retaining ends for different users.

Most eyeglasses retention devices have the distinct disadvantage of requiring multiple components and some require multiple sizes to adapt to eyeglasses temples of various shapes and sizes. Basically, there is a need for a device that can simultaneously provide retention for hearing aids, eyeglasses and masks. An improved invention for these needs should include the criteria of being a single unit and be compatible with most eyeglasses and BTE hearing aids. The current invention addresses these needs by addition of a single unit accessory to temples of eyeglasses that can provide retention of BTE hearing aids and/or eyeglasses. Additionally, it should allow a user to wear a mask without dislodging the BTE hearing aid housings when the mask is removed.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is an object, feature, and/or advantage of the present invention to improve on or overcome the deficiencies in the art.

It is an object of this invention to provide a single accessory device for eyeglasses that can retain eyeglasses on a wearer's head.

It is a further object, feature and/or advantage of the present invention to provide a single unit retention device without the need for multiple components, such as clips, cords, and sleeves, as well as retain BTE hearing aids manufactured by different hearing aid companies.

It is another object of the invention that provide for more securely attaching and holding of the device on eyeglasses temples.

It is still yet a further object, feature, and/or advantage of the present invention to provide a single unit retention device that is attached to temples of eyeglasses and not directly attached to hearing aids, thereby allowing a user to add and remove the eyeglasses having the device without dislodging or removing hearing aids.

It is still yet a further object, feature, and/or advantage of the present invention to retain the housing of a BTE hearing aid from dislodging during routine activity or during physical exercise.

It is still yet a further object, feature, and/or advantage of the present invention to retain the housing of a BTE hearing aid(s) in place while wearing eyeglasses.

It is a further object, feature and/or advantage of the present invention to provide a single unit retention device that is moveable unrestrictedly as needed, anteriorly, posteriorly, laterally and medially in relation to temples of eyeglasses when the device is attached to eyeglasses, allowing a user to adjust the device to improve eyeglasses retention.

It is a further object, feature, and/or advantage of the present invention to provide a combined hearing aid and eyeglasses retention device that can become a standalone eyeglasses retention device otherwise referred to as an eyeglasses retention device, that can retain eyeglasses from slipping down a user's nose when a user doesn't wear BTE hearing aids. Furthermore, the single unit retention device can retain most eyeglasses with temples of different sizes and shapes.

It is a further object, feature, and/or advantage of the present invention to add a lanyard to the posterior ends of eyeglasses temples or directly onto a retention device. Hence, if the eyeglasses are dislodged intentionally or accidentally off the user's ears or head, there is a safeguard to prevent eyeglasses from dislodging off the user.

It is a further object, feature, and/or advantage of the present invention to provide the eyeglasses retention device to be manufactured in combination with a lanyard as a single unit.

A further object, feature, and/or advantage of the present invention to allow a user to wear a mask while wearing BTE hearing aids without dislodging the hearing aids when the mask is removed.

It is another object, feature, and/or advantage of the present invention to allow a user to access volume buttons on the housing of the BTE hearing aids when the user is wearing eyeglasses with the BTE retention device.

It is preferred the devices be safe, cost effective, and durable. The devices should be manufactured inexpensively and should not require unnecessary customization for different sizes and shapes of eyeglasses temples or for different shapes or sizes of BTE housings.

The embodiments disclosed herein comprises a distinct aesthetic appearance. Ornamental aspects included in such embodiments can help capture a consumer's attention and/or identify a source of origin of a product being sold. These ornamental aspects will not impede functionality of the present invention.

It is a further object, feature, and/or advantage of the present invention for the retention device to be barely visible on a user when viewed anterior, namely from the front of the user's head.

Methods can be practiced which facilitate use, manufacture, assembly, maintenance, and repair of hearing aid and/or eyeglasses retention device(s) which accomplish some or all of the previously stated objectives.

These and/or other objects, features, advantages, aspects, and/or embodiments will become apparent to those skilled in the art after reviewing the brief and detailed descriptions of the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
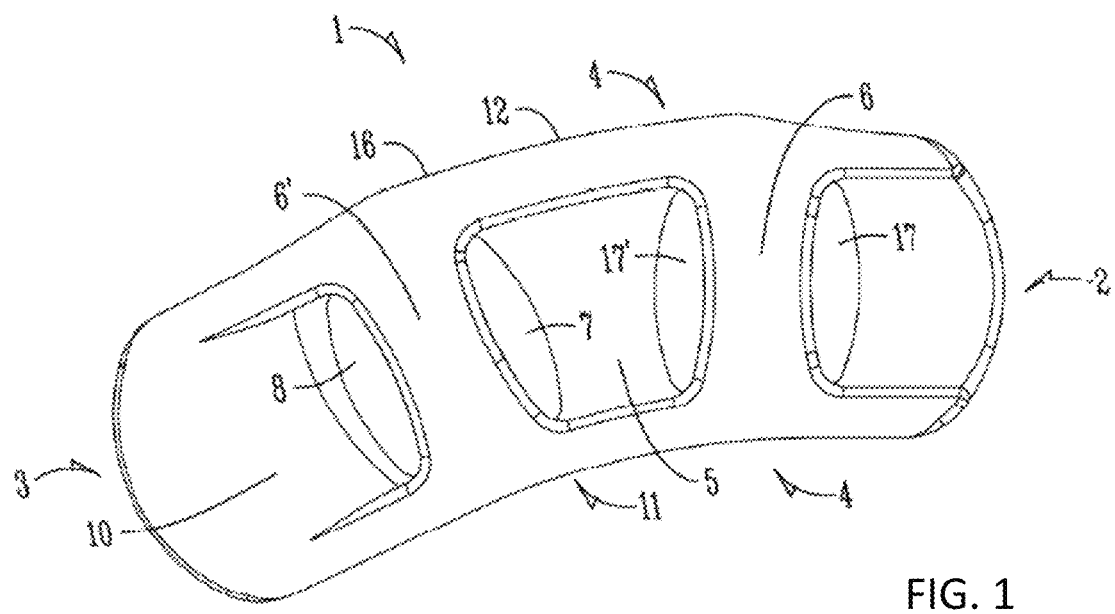
FIG. 1 shows an external side view of the exemplary embodiment of a combined hearing aid and/or eyeglasses retention device.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, or procedural changes can be made without departing from the spirit and scope of the present invention.

For definition and clarity purposes, use of the following terms referring to the device(s) 1, 20 are correspondingly interchangeable, such as anterior end or front end or front border 2, 24 and posterior end or back end or back border 3, 25.

The present disclosure describes novel devices attached to the temple 14 of eyeglasses that are capable of retaining BTE hearing aids from falling off a user's ear. The exemplary embodiment of the combined hearing aid and/or eyeglasses retention device 1 is shown in FIGS. 1-4 and comprises a single unit that are attached to each temple 14 of eyeglasses. The device 1 has an anterior or front end or border 2, a posterior or back end or border 3, a superior border 12, and an inferior border 11. The anterior end 2 of device 1 is rounded for aesthetic purposes but can be any shape. Device 1 has a medial side 9 with a slender strut referred to as the wall 16 which can be expanded as seen 26 in the second embodiment 20 (FIGS. 6, 8-10, discussed infra).

Located just posterior to the anterior end 2 of the external side 4 seen in FIG. 1 is a strap 6 (may also be referred to as a loop) surrounded on both sides with apertures 17, 17'. The user first pushes the posterior end of an eyeglasses temple 14 through aperture 17 under the strap 6 then back up through aperture 17' onto the external side 4 of the device 1. The strap 6 provides an attachment between the device 1 and the temple 14 and as such is also a holder of the device 1 on the eyeglass temple 14. The device 1 seen in FIG. 1 has an external side 4 with a groove 5 that is optional and a medial side 9 seen in FIG. 2; the external side 4 for positioning of eyeglasses temples onto the device 1, and the medial side 9 provides the contact side for retention of the BTE housing 33 on a user. Just anterior to the posterior end 3 of the device 1 seen in FIG. 1 are two apertures, 7, 8 that are located on both sides of a second strap 6' that acts as an additional attachment and holder between the device 1 and the temple(s) 14. This occurs when the posterior ends of temples 14 access through aperture 7, under strap 6' then back up through aperture 8 onto the external side of device 1. Thus, the straps 6, 6' provide means for securely attaching and holding at one or two distinct points the device 1 on eyeglasses temple(s) 14. As discussed further on, the user can decide to attach and hold the device 1 onto the temple 14 with one or more straps depending on the size of the temple and temple ends. Although not shown there is no limit to the number of straps as there could be one or more straps as part of the device 1. For example, the two straps 6, 6' can become one long strap with an aperture 17 on its anterior end and aperture 8 on the posterior end of the strap. In this example the posterior end of the temple 14 would be pushed through aperture 17, then traverse under the longer strap until it emerges through aperture 8 back onto the exterior side of the device. That example would be another means for attaching the temples 14 to the device 1.

As described the user attaches the device 1 onto the eyeglasses temples 14 by first slipping the posterior end(s) of the eyeglass temples 14 through aperture 17, under strap 6, and back through aperture 17' onto the external surface 4. The strap 6 has elastic and stretchable qualities such that it can be pushed slightly external and lateral to allow passage of the posterior eyeglasses temple ends 14 through apertures 17 and 17'. The elasticity of the strap 6 once stretched provides additional medial pressure for attaching and holding the device 1 when completely engaged on the temples of the eyeglasses. Once the posterior ends of the temples 14 slip through aperture 17', the user, depending on the need to attach to a temple that has smaller height, usually less than 5 mm in height), pushes the temples posteriorly on the external side 4 of the device 1 along groove 5 and into aperture 7 under strap 6' then back up through aperture 8 and onto external side 4 of the device 1. The structures of the attaching means of the device 1 are comprised of the strap 6 and 6' which also comprise the holding means on the temples 14. The elasticity of the strap 6' once stretched provides additional medial pressure for attaching and holding the device 1 when completely engaged on the temples 14 of the eyeglasses. The user with temple ends that are large (usually 5 mm or more in height) can attach and hold the temple ends by pushing the temple ends through aperture 17 under strap 6 and back up through aperture 17'. Again, user's with smaller temple ends 5 mm or less in height or wire frame temple ends may need to be attached and held by pushing the temple ends under and through both straps, 6, 6'.

The devices 1, 20 (the latter device 20 to be detailed below) once attached on temples 14 they are then positioned juxtaposed lateral to the BTE housing 33 for BTE hearing aid retention. Additionally, the temple(s) 14 of eyeglasses have biased compressive properties that can provide medial pressure onto housing(s) 33, thereby assisting in maintaining the housing(s) 33 in place on the user's ears.

Figure 4:
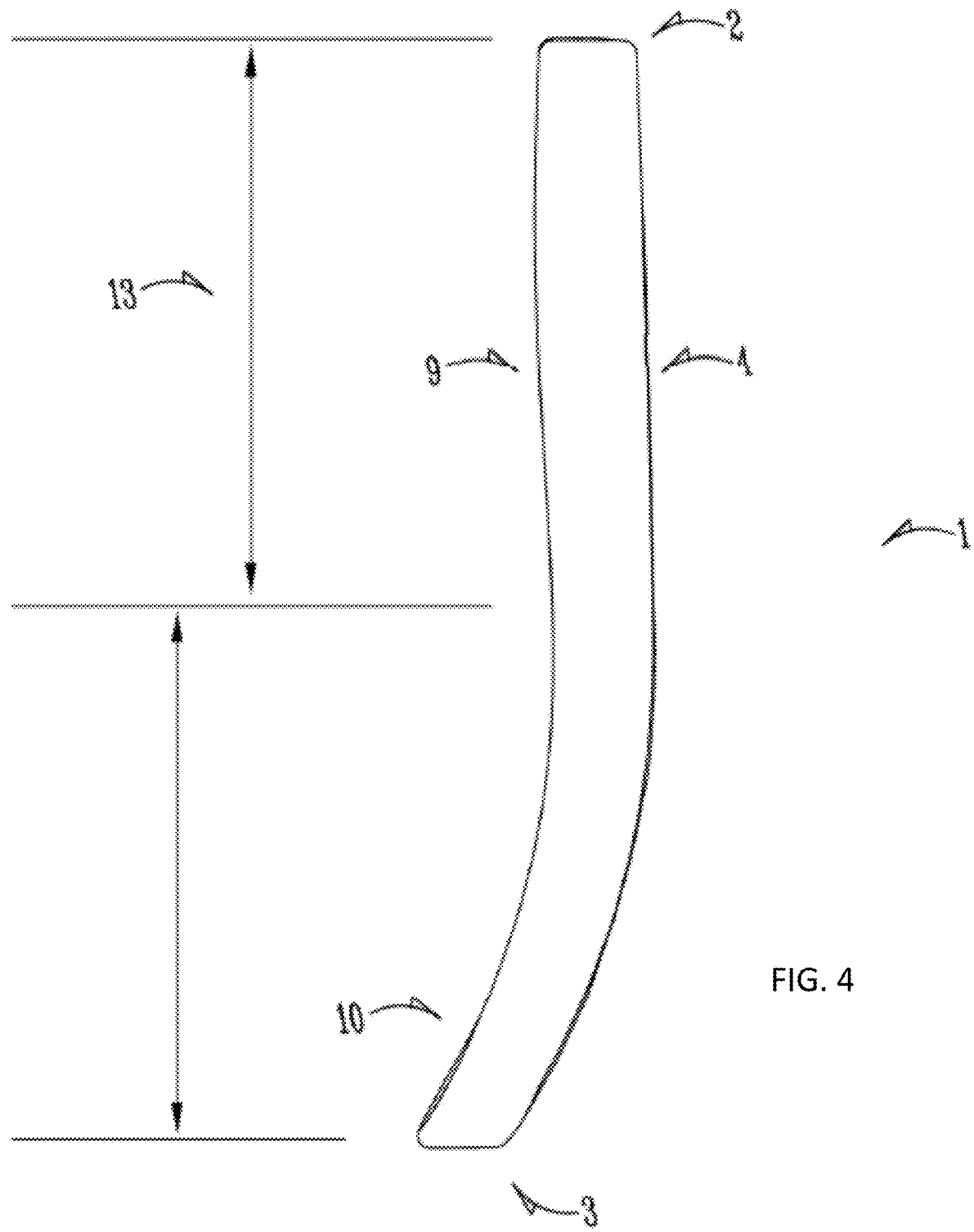
FIG. 4 shows top longitudinal perspective view of the exemplary embodiment of a combined hearing aid and/or eyeglasses retention device shown in FIG. 1 with the medial curved flap located on its posterior end.
Figure 5:
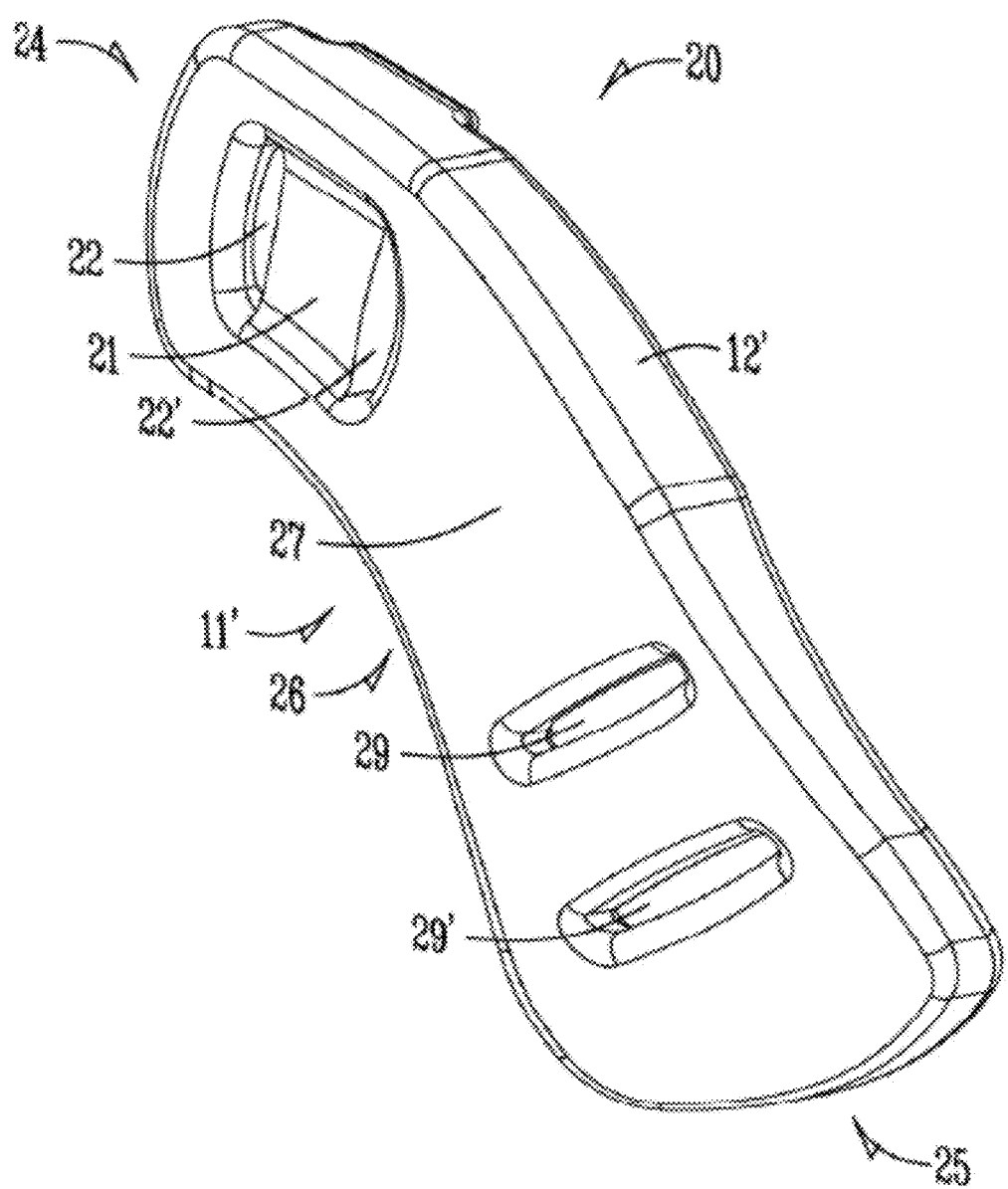
FIG. 5 shows a medial side view of the second embodiment of a combined hearing aid and/or eyeglasses retention device.
Figure 6:
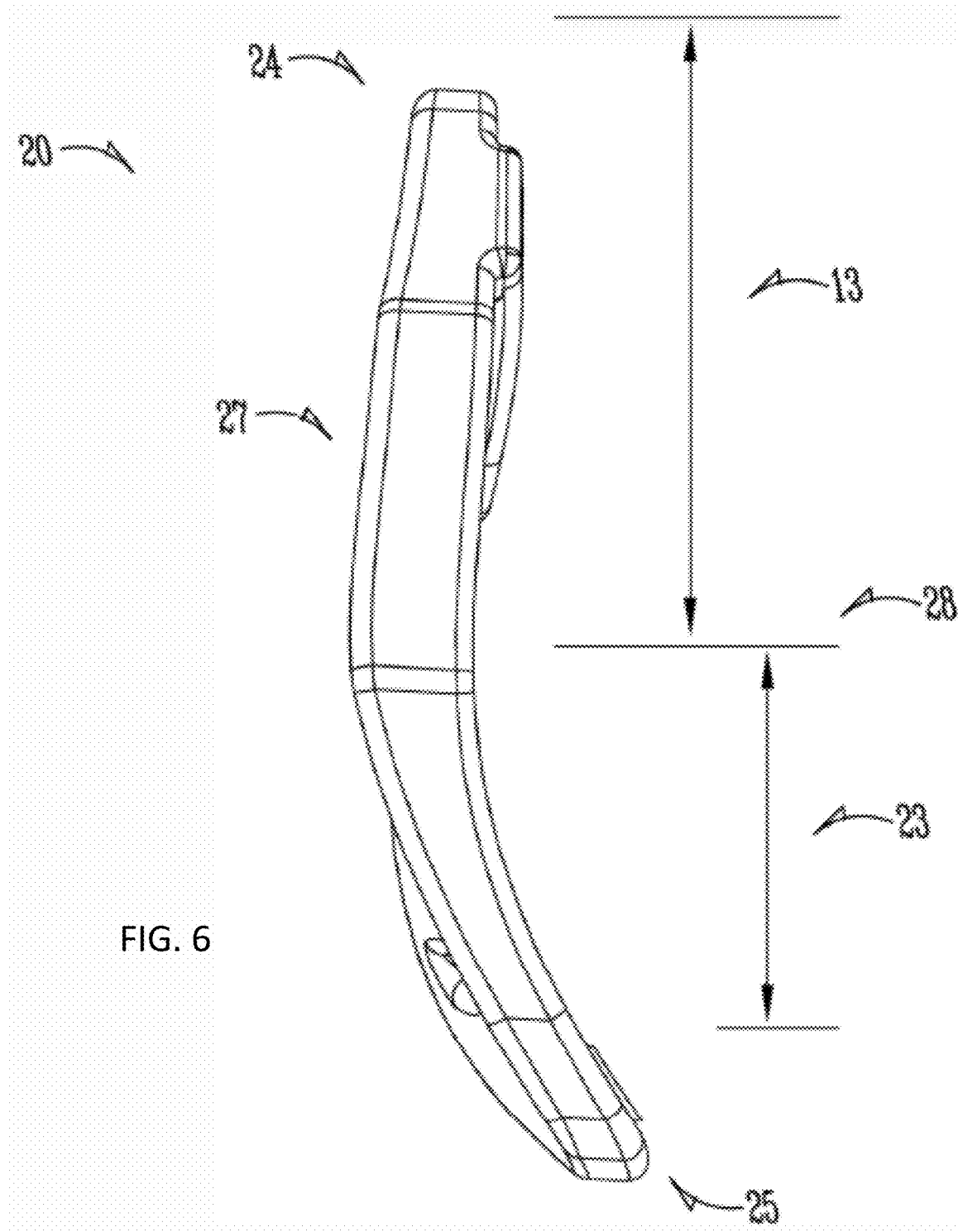
FIG. 6 shows top longitudinal perspective view of the second embodiment of a combined hearing aid and/or eyeglasses retainer shown in FIG. 5 with lateral curved flap located on external posterior side.

When the posterior end(s) of the temple(s) 14 is threaded into aperture 17 under strap 6 and resurfaces through aperture 17' onto the exterior side 4 of device 1, it creates further medial bending force forming a medial curved flap(s) 10 on the posterior end of the device 1. The curved flap(s) 10 is angled medially in relation to the longitudinal axis 13 of the device 1 as seen in FIG. 4. The curved flap(s) 10 can function to directly contact or be in close proximity to the surface of the user's head and provides a means for eyeglasses retention. The curved flap(s) 10 can be any angle in relation to the longitudinal axis 13 of the device 1 to function as means for eyeglasses retention. It is preferred the angle is less than ninety (90) degrees, and it is most preferred the angle be between fifteen (15) degrees and forty-five (45) degrees; however 45 degrees seems to be the most suitable angle. The curved flap(s) 10 as mentioned occurs by a natural bending force when the device 1 is attached to the temple(s) 14 through the aperture 17.

The user can adjust eyeglasses retention by positioning the proximity of the curved flap(s) 10 to the user's head. The user for comfort may decide to adjust the device by pushing temple end 14 under one strap 6 and not through and under strap 6' to allow the flap 10 to extend posteriorly, and as such, be close but not be in direct contact with the user's head.

However, if the temple(s) 14 are small in size (such as a height of less than 5 mm including thin metal frames) they may not exert bending force to create adequate medial curved flap(s) 10 capable of eyeglasses retention. Hence, it is preferable to pre-form the curved flap(s) 10 during the molding manufacturing process. If the temple is not pushed entirely through the aperture 8, the medial curved flap(s) will represent the preformed medial curved flap(s) 10 with a definitive angle in reference to the longitudinal axis 13. Once the posterior temple end 14 is pushed entirely through aperture 8 then the angle of the medial curved flap(s) 10 is torqued more acute in reference to the longitudinal axis 13. Still it is preferable to pre-form the curved flap(s) 10 during the molding manufacturing process at an optimal medial angle such as 45 degrees in relation to the longitudinal axis 13 seen in FIG. 4. It is understood that the flap(s) 10 can be any shape to provide medial curve(s) that function to retain eyeglasses in place.

Figure 13:
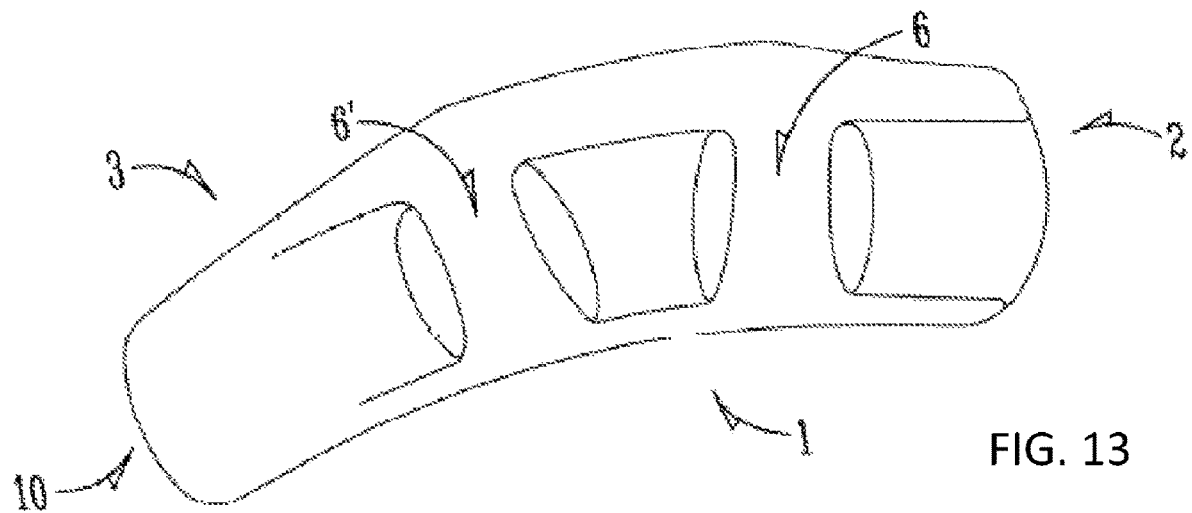
FIG. 13 shows a modification of the first embodiment of the combined hearing aid and/or eyeglasses retainer comprised of an extended posterior flap.

As mentioned, the flap 10 can be pre-formed preferably at or near a 45-degree angle medially in reference to the longitudinal axis 13 of the device 1. The angle of the flap 10 in reference to the longitudinal axis 13 can be any angle that will allow the flap to function which is to retain the eyeglasses in place by contacting or be close to contacting the user's head. In addition, the flaps 10 can be thin in width, FIG. 13, so that when eyeglasses are removed forward off the ears, the flaps 10 do not dislodge the housings 33 of the hearing aids off the user's ears. The thinness of the flaps 10 allow the devices 1 to delicately contact the housings 33 and not move the housing 33 off the ears. The length of the flaps 10 can be extended posteriorly so there is adequate purchase of the devices 1, 20, FIG. 13 to contact the user's head or pinnae respectively to retain eyeglasses in place.

Figure 14:
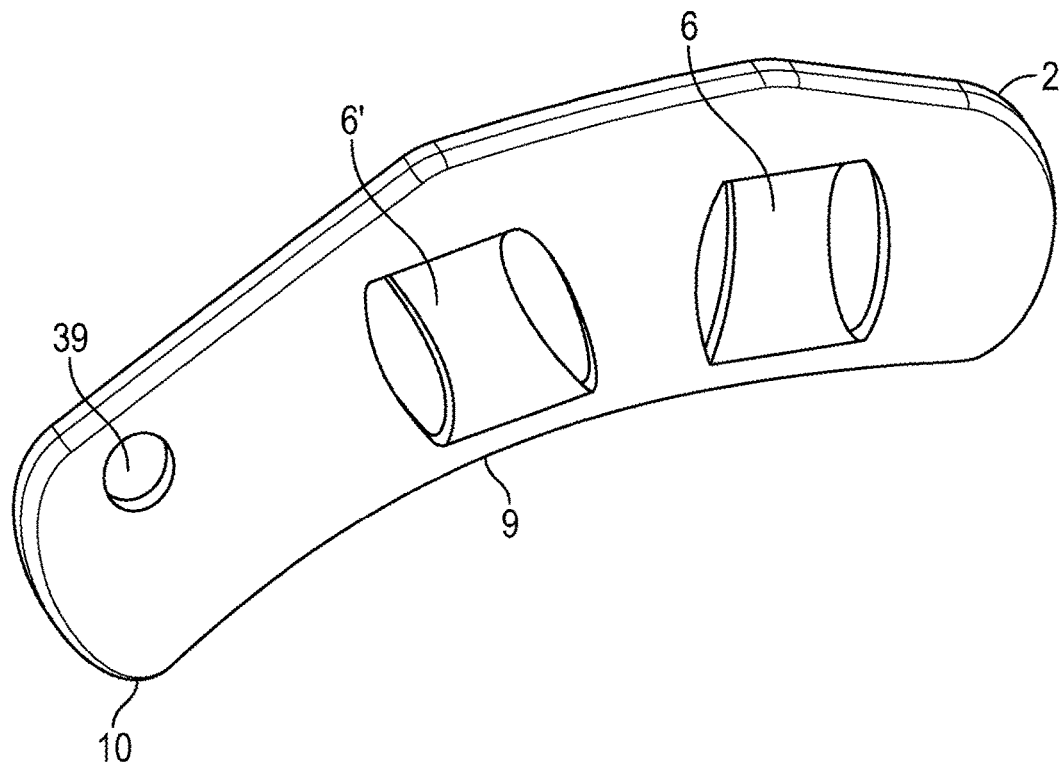
FIG. 14 shows a modification of the first embodiment of the combined hearing aid and/or eyeglasses retainer having a lanyard attachment feature located on the flap for attachment of a lanyard.
Figure 15:
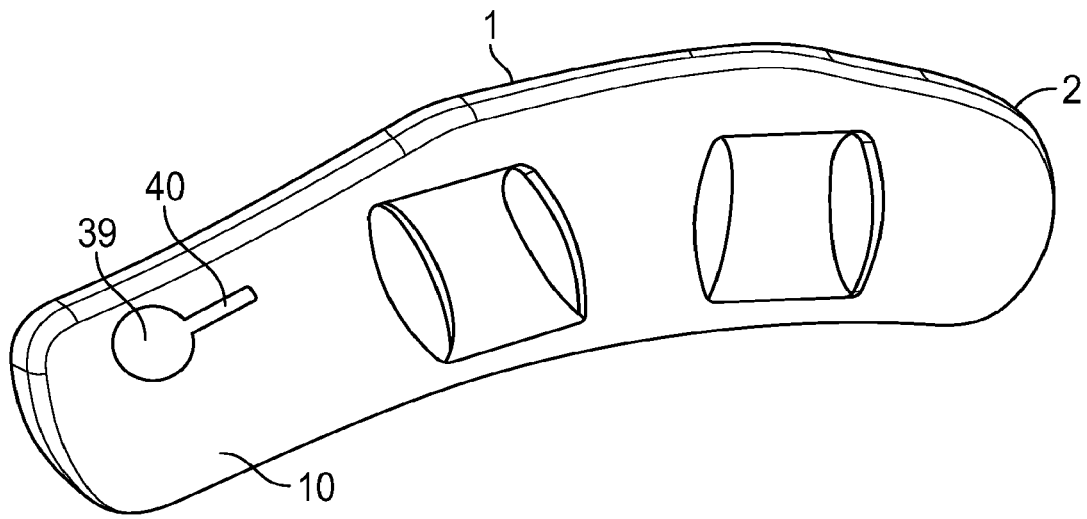
FIG. 15 shows a modification of the first embodiment of the combined hearing aid and/or eyeglasses retainer having a horizontal slit located at the 270-degree position of the lanyard attachment feature.

Either device(s) 1, 20 for a combined hearing aid and/or eyeglasses retention device can be combined with a lanyard in the event a user wants to retain their eyeglasses once removed from their head. The posterior ends of the flaps 10, 23 can be reduced in circumference so that tethers of a commercial lanyard can be directly connected to them. Additionally, the exterior sides 4, 28 of devices 1, 20 respectively can have a protrusion for attachment of a commercially available lanyard. This then allows the eyeglass retention devices 1, 20 to be manufactured so that commercial existing lanyards can be attached to ends of devices 1, 20. The devices 1, 20 can also be manufactured with another structure to permit attachment of a lanyard. One structure to attach a lanyard to either of the device(s) 1, 20 includes a hole(s) 39, FIG. 14, in the devices 1, 20 wherein a rope lanyard (not shown) can be pushed through the holes 39 located on flaps 10, 23 of either pair of the devices 1, 20 respectively. The ends of the rope would have a larger diameter than the holes 39 so that the rope is retained when forced through the holes 39; however, the user can reversibly remove the rope from the device(s) 1, 20 by forces that can stretch the holes 39 to allow removal of the rope. There can be a horizontal slit 40, FIG. 15, emanating 270 degrees from the 39 hole towards the anterior end 2, 24 of devices 1, 20 respectively that can permit the user to push the end of rope horizontally into the hole 39. The slit 40 also permits the user to reversibly remove the rope from attachment to the devices 1, 20. The rope can have a widened flat end with a diameter greater than the hole 39, such that the flat end of the rope can be pushed through the slit 40 into and through the 39 holes. The holes 39 can be situated any location convenient for the comfort of the user and functionality of the devices 1, 20. An ideal location would be on the superior-posterior ends of the flap(s) 10, 23, FIGS. 14, 15.

The tethers of commercial lanyards can also be placed on the posterior ends of eyeglass temples 14 when the devices 1, 20 are also attached to temples 14. Lastly, a lanyard can also be manufactured as a single unit as part of the devices 1, 20.

Figure 2:
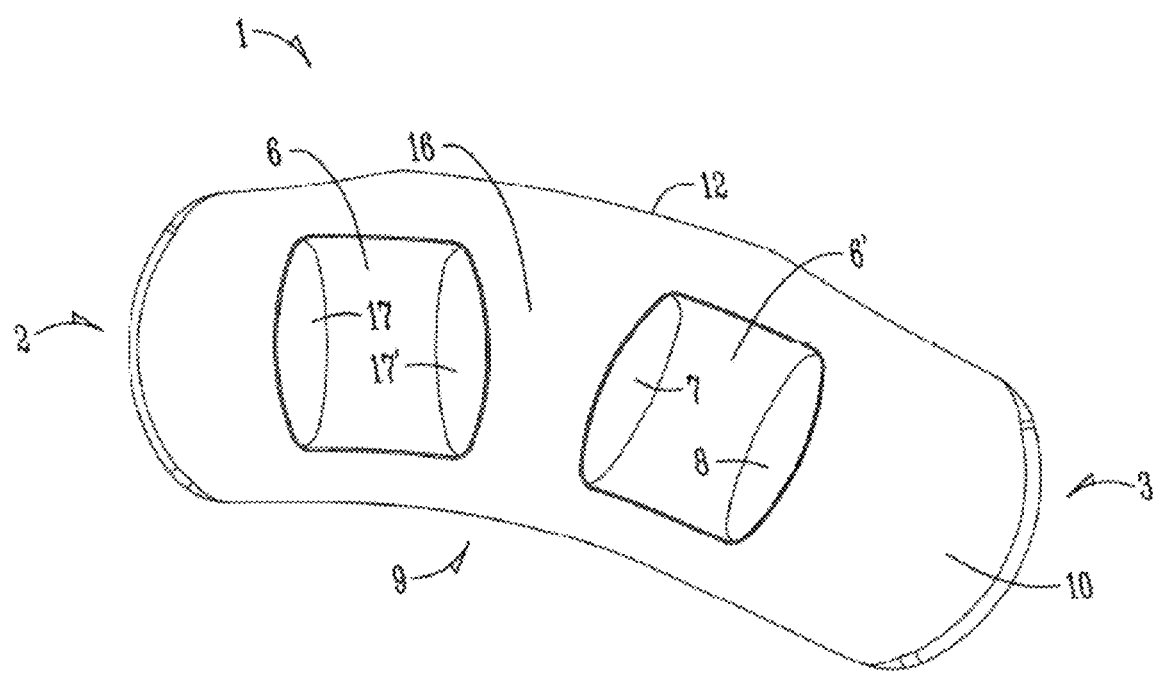
FIG. 2 shows a medial side view of the exemplary embodiment of combined hearing aid and/or eyeglasses retention device shown in FIG. 1.
Figure 3:
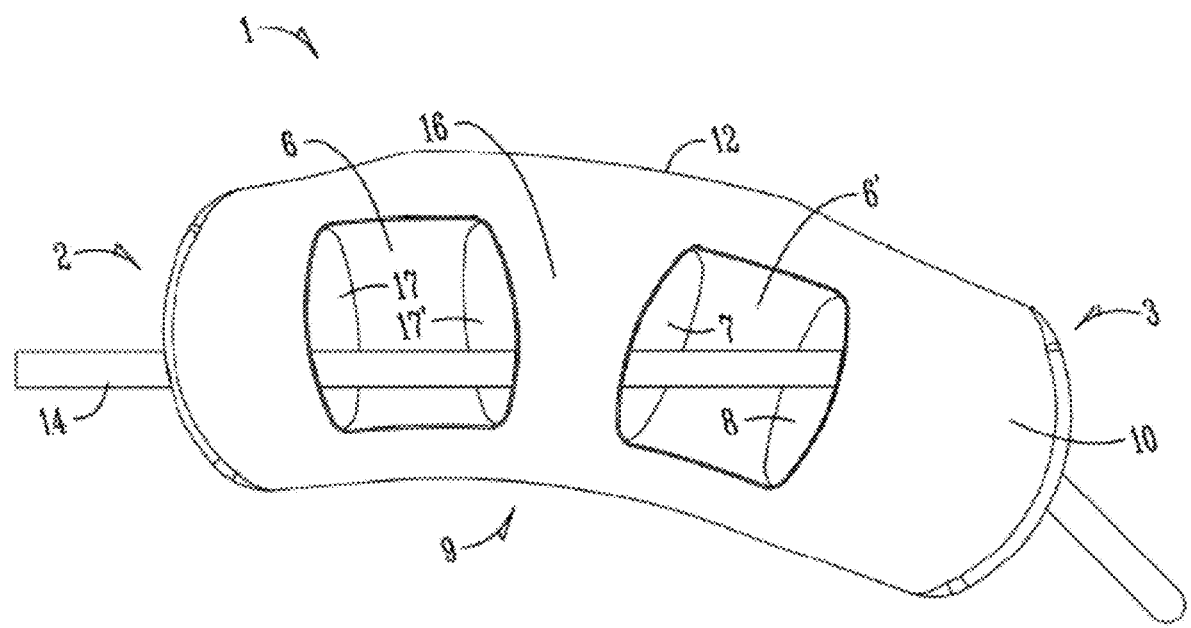
FIG. 3 shows a medial side view of the exemplary embodiment of a combined hearing aid and/or eyeglasses retention device shown in FIG. 1 attached to temples of eyeglasses.
Figure 7:
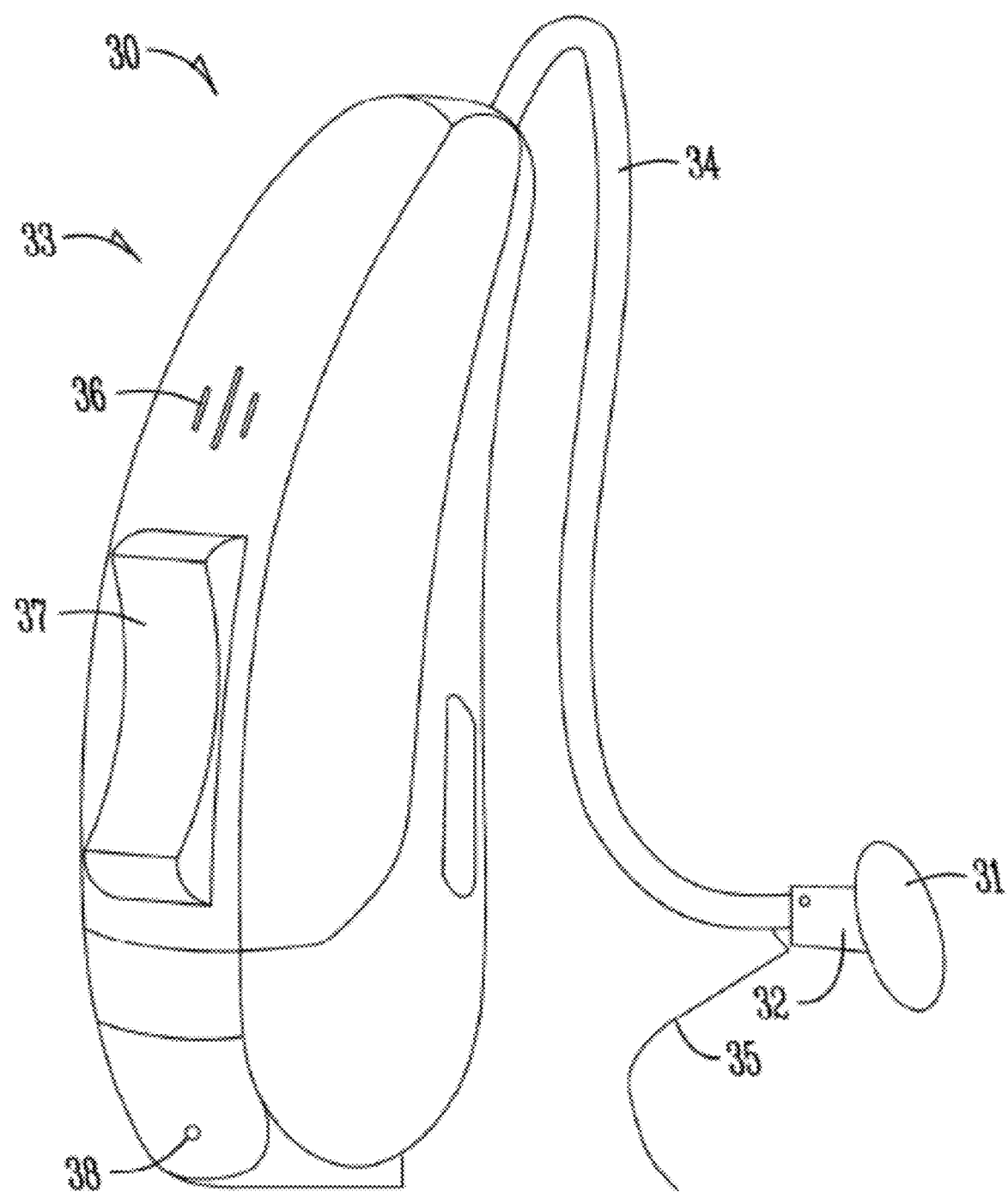
FIG. 7 shows a detailed perspective view of a BTE hearing aid with a housing.
Figure 8:
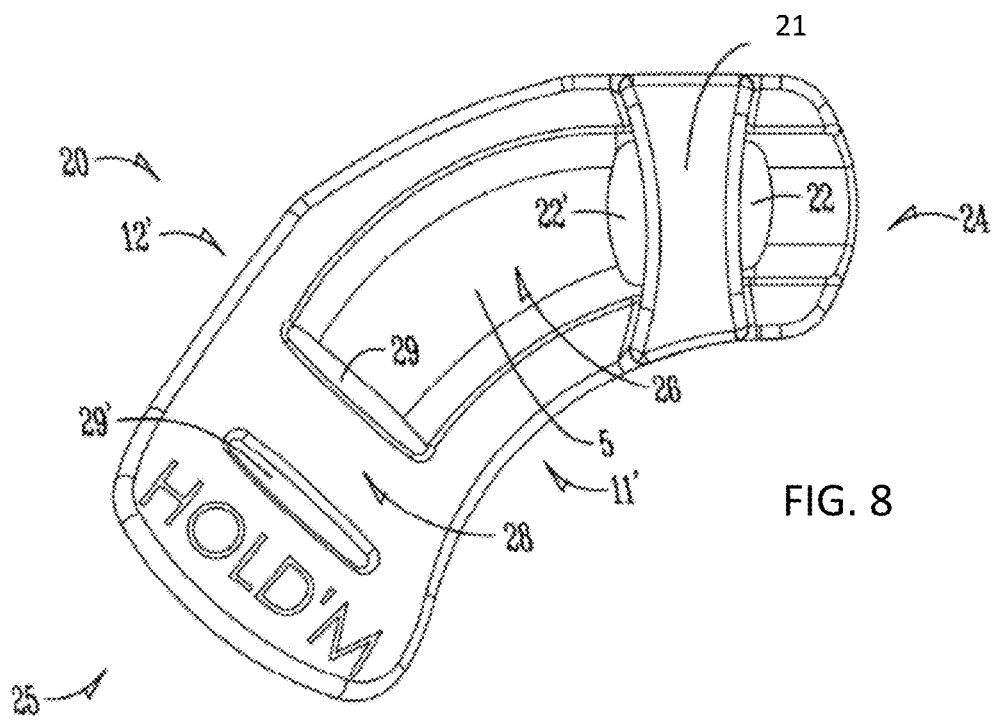
FIG. 8 shows the external side view of the second embodiment of a combined hearing aid and/or eyeglasses retention device shown in FIG. 5.
Figure 9:
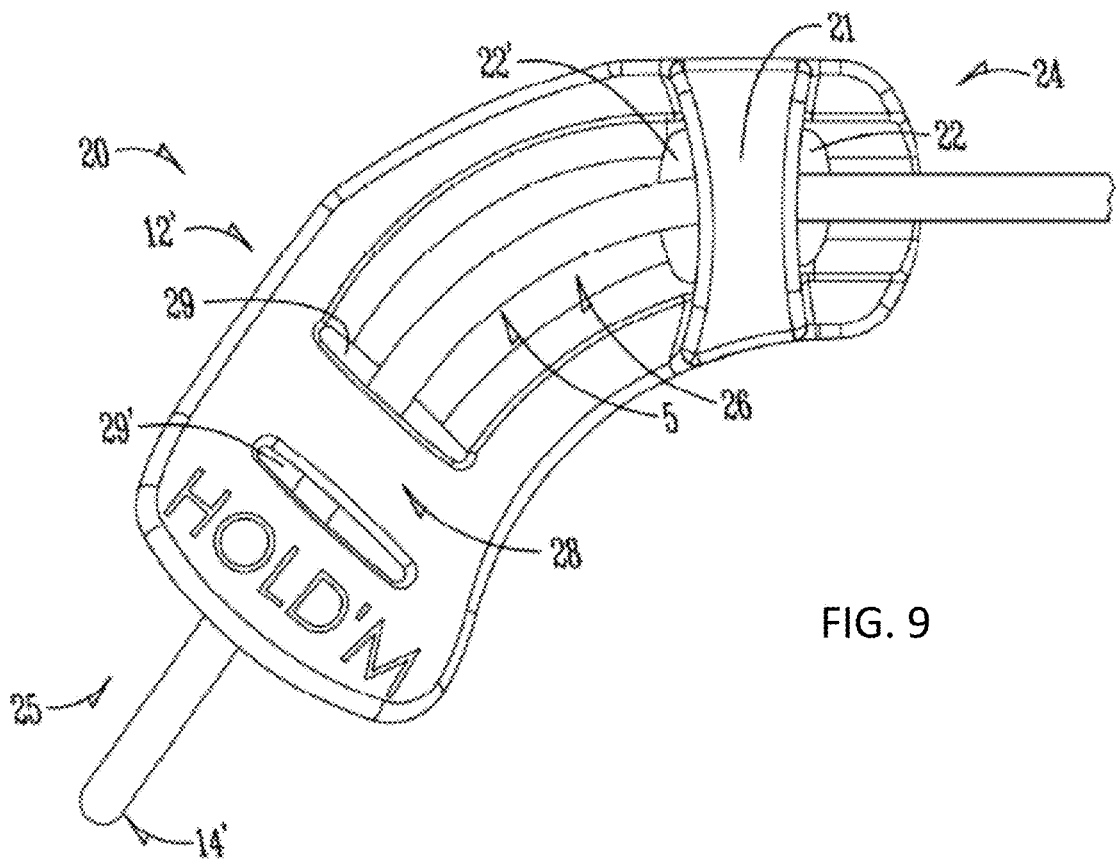
FIG. 9 shows external side view of the second embodiment of a combined hearing aid and/or eyeglasses retention device shown in FIG. 8 attached to temple(s) of eyeglasses.
Figure 16:
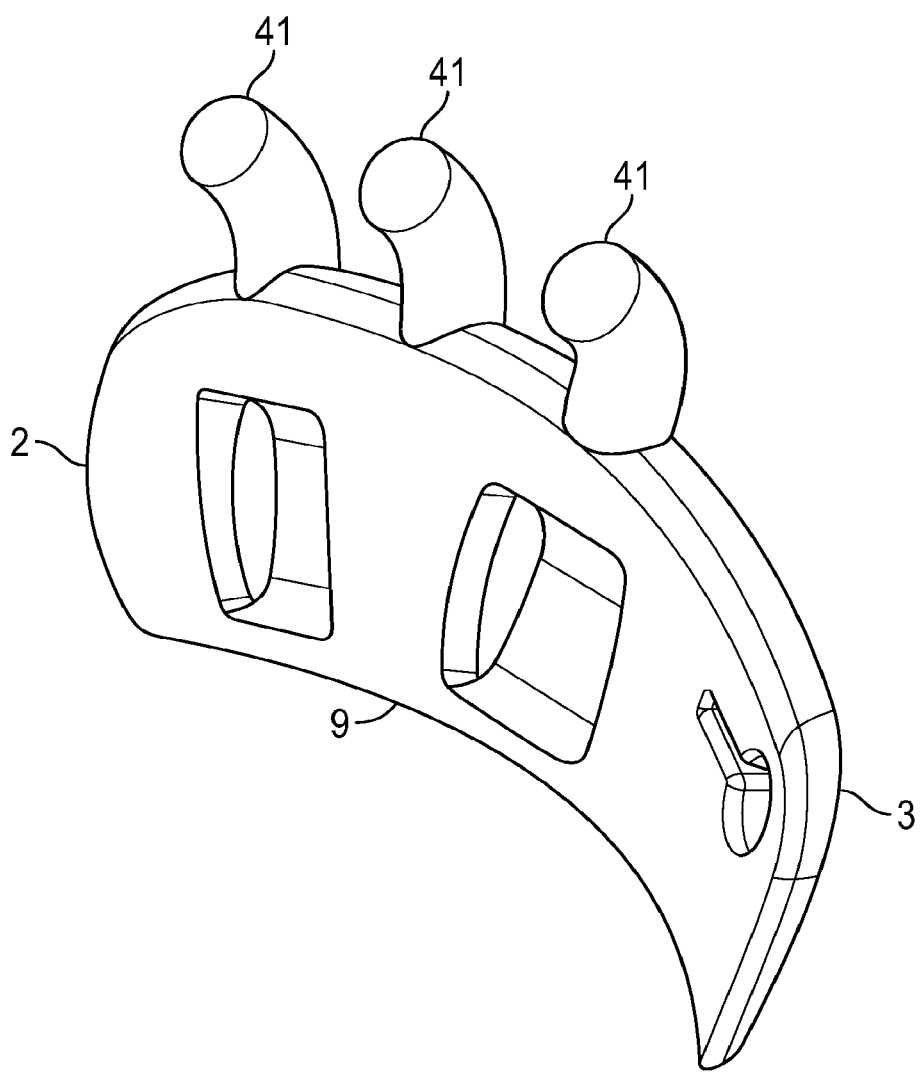
FIG. 16 shows an exemplary embodiment of a combined hearing aid and/or eyeglasses retainer device with ribs arching medially from superior edge of the device to maintain the position of an around the ear hearing aid.

The BTE hearing aid housings 33, FIG. 7, are positioned on the anatomical ridge located in the sulcus of the ear, which is the connection of the pinnae to the scalp. Once the device 1 is placed onto the temples 14, the user first positions the eyeglasses, such that the medial side 9, seen in FIG. 2, is positioned on or near the anatomical ridge located in the sulcus of the ear and juxtaposed lateral to the BTE housings 33. Parts or all of the medial side 9 of device 1 provide for retention of the housing(s) 33 when the medial side 9 is juxtaposed and lateral to the housing(s) 33. The retention feature of the medial side 9 may accomplish this by imposing a lateral cover adjacent to the housing(s) 33 located on the anatomical ridge in the sulcus of the user(s) ears. The structures of the first embodiment of the combined hearing aid and/or eyeglasses retention device 1 or second embodiment of the combined hearing aid and/or eyeglasses retention device 20 can have one or more ribs 41, FIG. 16 or complete roof (not shown) emanating medially from the superior border(s) 12, 12' respectively, over the top of the BTE housing(s) 33 to also help retain the BTE on the user's ears.

Additionally, the medial curved flaps 10 can provide a posterior barrier to prevent displacement of the housing(s) posteriorly off the user's ears. The devices 1 with medial sides 9 and with or without ribs or roofs and with the curved medial flap(s) 10 can provide means for retention of housing(s) 33 on user's ears by partially encircling the BTE housing(s) 33 situated on a user's ear(s). This functionality is important for a user needing to wear and remove a mask when also wearing BTE housings 33. The ties or strings of a mask are placed lateral to the device 1 so they cannot easily access and entangle the housing(s) 33, thereby creating a barrier that prevents entanglement of the housing 33. Consequently, the housings 33 do not flip off the user's ears when a mask is removed.

Once positioning of the medial side 9 of device 1 lateral to the housing 33 is accomplished, if desired, the user can make one more adjustment so that the curved flap(s) 10 of the device 1 may contact the surface(s) of the user's head or be in close proximity to the user's head. This contact provides retention of the eyeglasses on the user's nose and head by minimizing sliding of the eyeglasses down the user's nose, thereby keeping the device 1 in place in relation to the BTE housing 33, allowing for further retention of the BTE housings 33 on the user's ears. The user can adjust the device 1 for comfort, and for retention of BTE housings 33, and at the same time maintain ideal positioning of the user's eyeglasses for optimal visual acuity. This can be done by moving the device 1 in directions that are unrestricted such as anteriorly, posteriorly, medially or laterally as needed on the temple(s) 14 so that device 1 can be positioned optimally juxtaposed lateral to the BTE housing 33. In addition, the user may elect to place the temple end(s) under one strap to keep the flap(s) 10 from contacting the head but still in close proximity posterior to the user's head. Furthermore, moving the device 1 in unrestricted directions, such as anteriorly, posteriorly, medially or laterally on the temples 14, permits the curved flap(s) 10 of device 1 to directly contact the surface(s) of the user's head or be in close proximity to the user's head.

The medial curved flap(s) 10 represents the exemplary embodiment of a means to contact the user's head for eyeglasses retention. However other means for eyeglasses retention can contact the user's head, such as a protrusion of any shape and size located on the medial side 9 of the device 1. A similar protrusion is shown with the second embodiment 20, FIG. 10 having a protrusion 18 located on its external side 28 to engage the user's pinnae for eyeglasses retention. In both embodiments, 1, 20, the protrusion 18 can be located on the medial side 9 of embodiment 1 or the external side 28 of embodiment 20. and would serve as the means to contact the user for eyeglasses retention.

Figure 10:
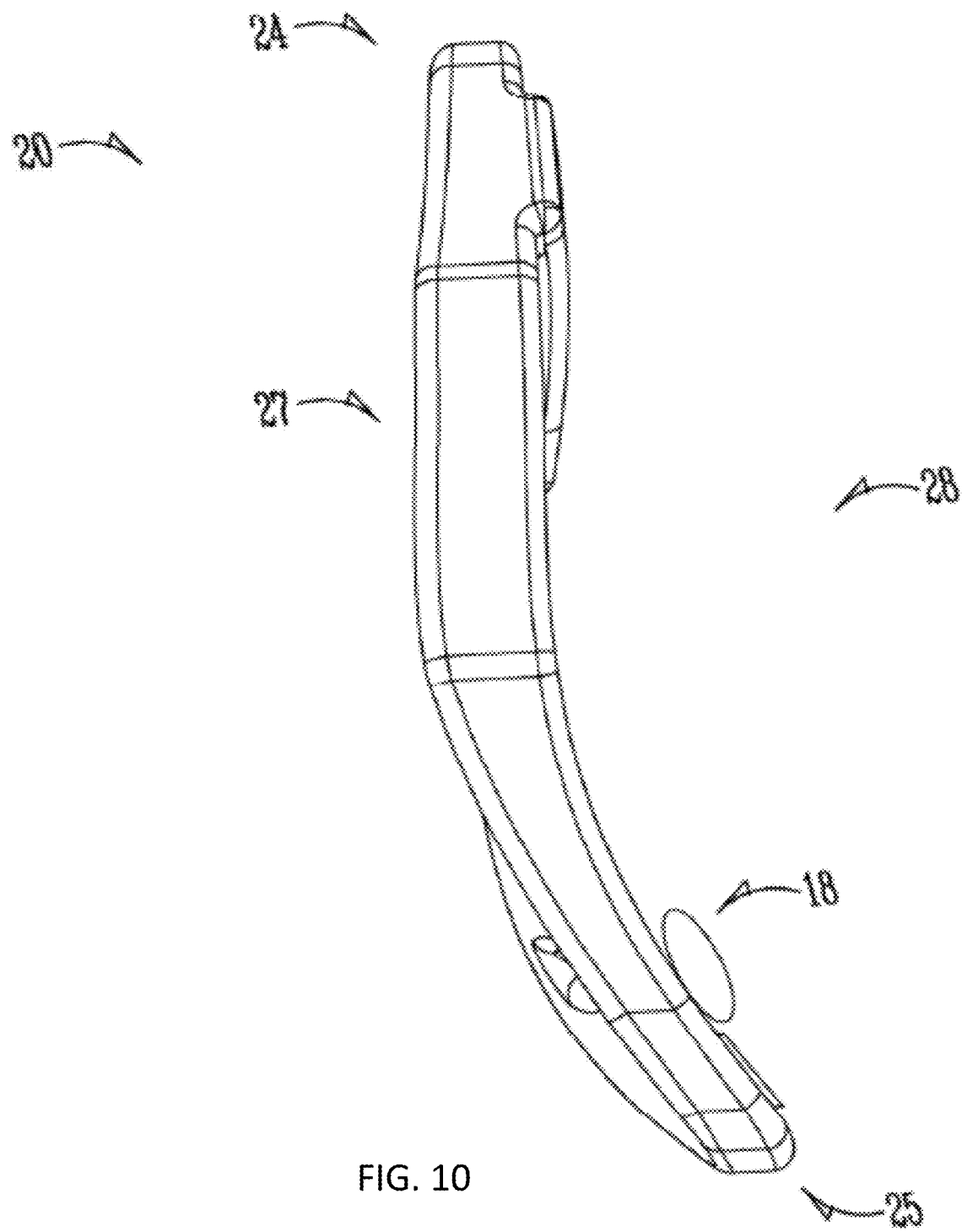
FIG. 10 shows view of top longitudinal perspective of the second embodiment of a combined hearing aid and/or eyeglasses retention device with protrusion located on the external posterior end.

A second embodiment of the hearing aid retention and eyeglasses retention device 20, FIGS. 5, 6, 8, 9, 10, has analogous elements of device 1. A difference is a strap 21 located on the anterior end and there are two slits 29, 29' located on the posterior end 25 of the device 20. The anterior strap 21 and slits 29, 29' provide attaching and holding means for device 20 onto the temples 14 of eyeglasses. The posterior end(s) of the temple(s) 14 are pushed through aperture 22, then under the strap 21 and back up through aperture 22', then slid along the external side into one of the slits 29 or 29', depending on the user's selection for best fitment of the device 20. A lateral curved flap(s) 23 is formed, FIG. 6, by the torque of the posterior end(s) of the temple(s) 14 through one of the slits 22, 22' on the posterior ends of device 20. The lateral curved flap(s) 23 provide means for eyeglasses retention when the lateral curved flap(s) 23 contacts the posterior surface of the user's pinnae. The curved flap(s) 23 can be any lateral angle in relation to the longitudinal axis 13, FIG. 6. Ideally for best function the angle can range from fifteen (15) to forty-five (45) degrees or any angle that will allow flaps 23 to contact the user's pinnae to retain the eyeglasses in place. The curved flap(s) 23 can also be preformed during the molding manufacturing process. There are other means for eyeglasses retention that can contact the posterior surface of pinnae, such as a protrusion 18 of any shape and size located on the external side 28 of wall 11 of the device 20, as shown in FIG. 10.

Although not illustrated, embodiment device 20 can also be made with one or more anterior slit(s) in lieu of anterior strap 21 and one or more posterior slits 29, 29'. The combination of anterior and posterior slits can provide another attaching and holding means of device 20 on the temples 14 of eyeglasses.

The device 20 has a feature for adjusting the position of the lateral curved flap(s) 23 in reference to contacting the posterior surface of the user's pinnae for eyeglasses retention. If the posterior end of the temple(s) 14 is positioned just through slit 29, the angle of the lateral curved flap(s) 23 in reference to the longitudinal axis 13, FIG. 6, maybe almost the same as the pre-formed lateral curve. Moving the end of the temple(s) 14 more posterior through slit 29', then the angle of the lateral curved flap(s) 23 becomes more torqued and gradually becomes more acute laterally in reference to the longitudinal axis 13. The more acute the angle of the lateral curved flap 23 becomes, the closer it is to the user's posterior surface of the pinnae, creating a tighter fit for eyeglasses retention. Hence, the user can adjust eyeglasses retention by adjusting the optimal angle of the lateral curved flap(s) 23 for best positioning of the curved flap(s)$_{23}$ to the posterior aspect of the user's pinnae. It is understood that the flap(s) 23 can be any shape other than curved that function to retain eyeglasses in place.

Once the device 20 is placed onto the temples 14, the user first positions the eyeglasses, such that the medial side 27 of wall 26 with its inferior border 11' is positioned on or near the sulcus of the ear juxtaposed lateral to the BTE housings 33. Parts or all of wall 26 provide means for retention of the housing(s) 33 when the device 20 is in the juxtaposed lateral position in relation to the housing(s) 33 on the user's ears. Once positioning of the medial side 27 of wall 26 is accomplished, if desired, the user can make one more adjustment so that the curved flap(s) 23 of the device 20 is near or in contact to the posterior surface(s) of the user's pinnae. This provides retention of the eyeglasses on the user's nose and head by minimizing sliding of the eyeglasses down the user's nose, and thereby keeping the device 20 in optimal relationship to the BTE housing 33, allowing for further retention of the BTE housings 33 on the user's ears. The user can adjust the device 20 for comfort, retention of BTE housings 33 and at the same time maintain positioning of the eyeglasses to obtain optimal visual acuity. This can be done by: (1) moving the device 20 in unrestricted directions anteriorly, posteriorly, medially or laterally as needed on the temple(s) 14 in order that the medial side 27 of the device 20 can be positioned optimally juxtaposed lateral to the BTE housing 33 and/or (2) by moving temple ends 14 more posterior through one of the slits 29, 29' so that the curved lateral flap(s) 23 of device 20 can contact the posterior surface(s) of the pinnae.

A BTE hearing aid 30 is shown in FIG. 7. The BTE hearing aid 30 comprises a curved housing 33 which houses microphone ports 36, amplifiers, and other electronics such as microchips to receive and process sound. The BTE curved housing 33 is positioned on the top and posterior ridge of the ears located in the sulcus which is the anatomical connection of the pinna to the scalp. Attached to the housing 33 is a flexible speaker tube with wires 34 that transfers sound to its terminus. In a non-limiting example, the speaker tube can be a speaker-receiver 32 located within ear buds 31 or molds positioned inside the auditory canal of the user. A flexible retainer strip 35 creates a bending force when positioned inside the concha to secure the housing and speaker in place. Other features of a generic BTE hearing aid include volume buttons 37 for the wearer to change the sound intensity and a battery compartment 38.

A cochlear implant sound processor ("CIP") is curved similar to the housing 33 but they are much larger. The principles described herein for retention of a hearing aid housing 33 can also pertain to a CIP. CIP retention can be applied to all embodiments of hearing aid retention for housing 33 that are described in the present disclosure. Modifications for all the embodiments may be needed to accommodate the larger size of a CIP while maintaining the elements of the disclosed embodiments.

Figure 11A:
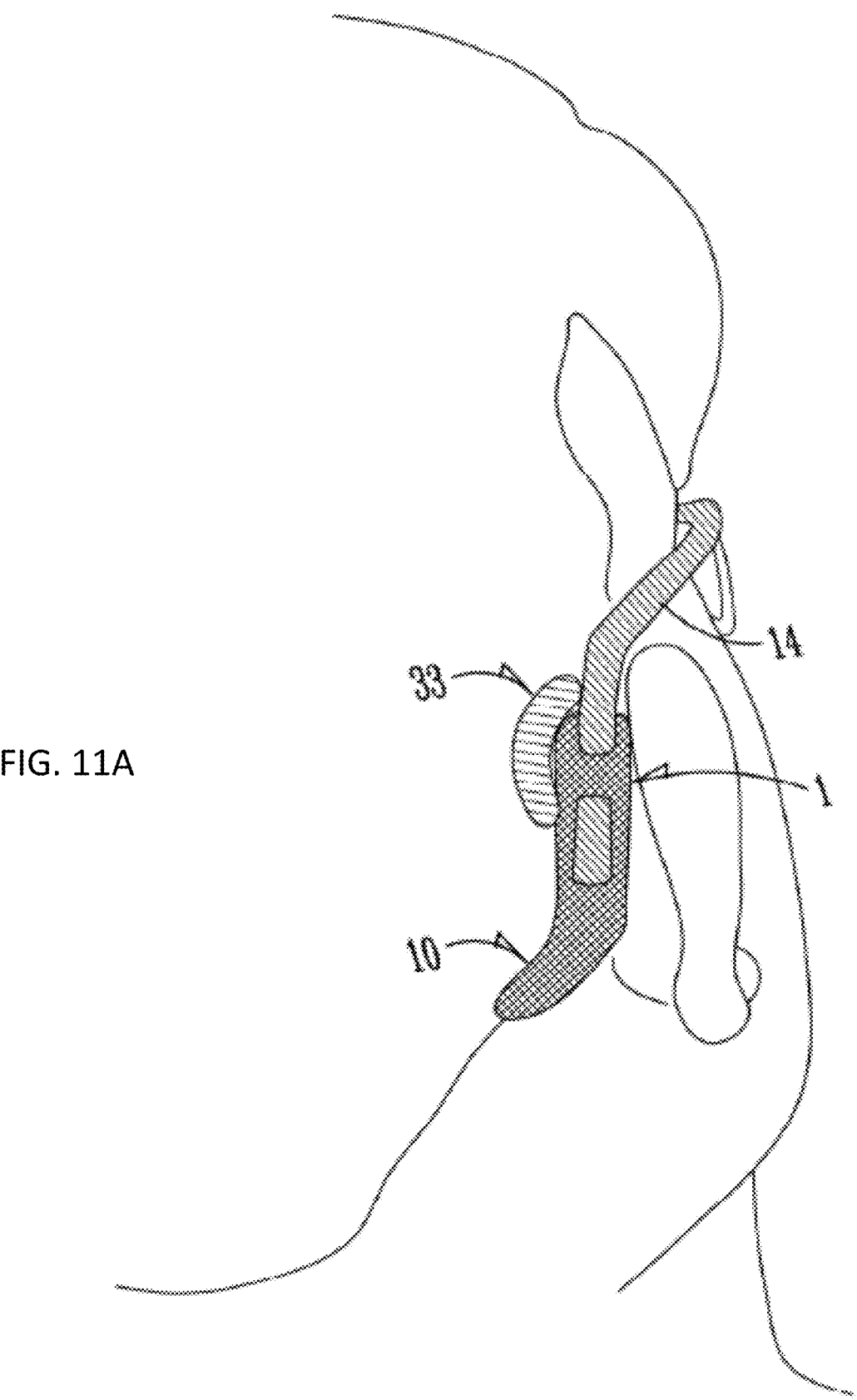
FIG. 11A shows exemplary embodiment of a combined hearing aid and/or eyeglasses retainer device as shown in FIG. 1 attached to temple of eyeglasses positioned on the ear of a user lateral to a BTE hearing aid housing and the medial curved flap of device contacting user's head.
Figure 11B:
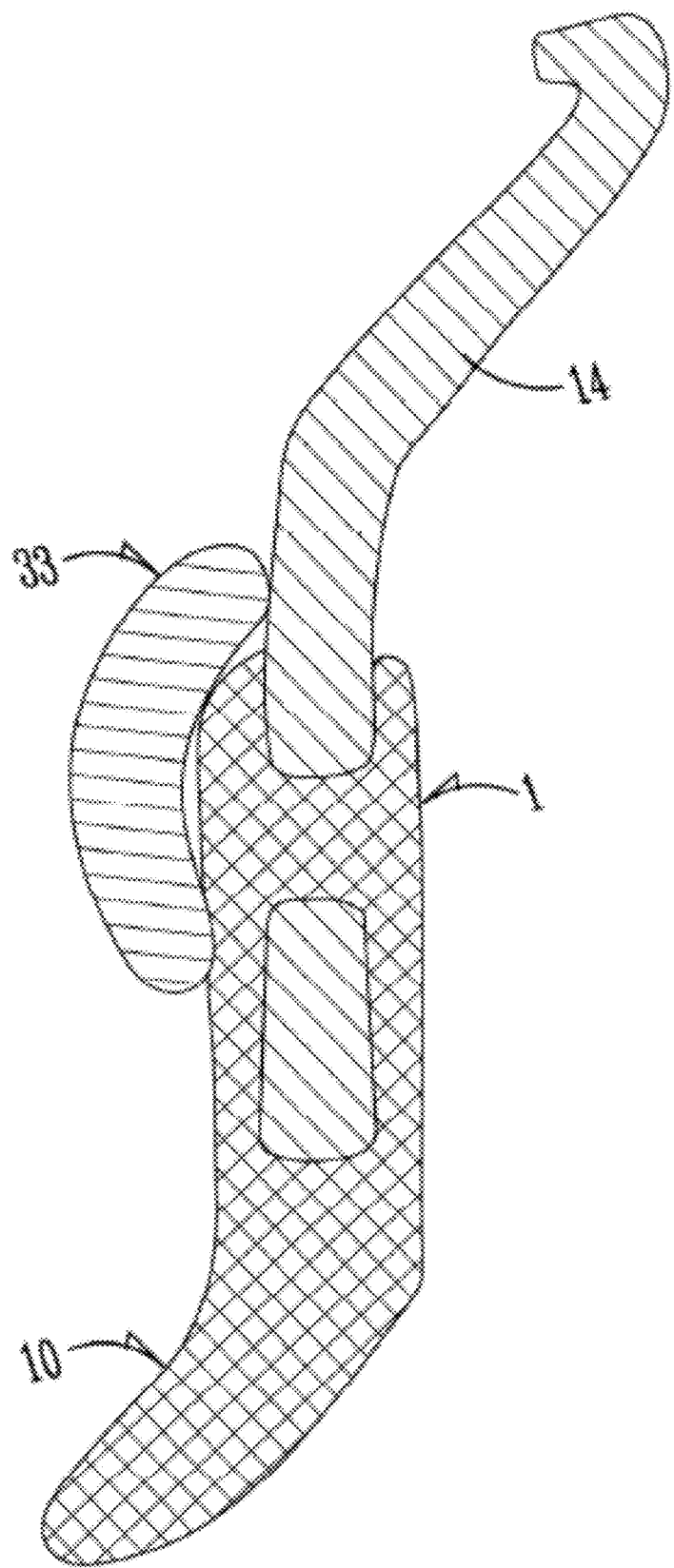
FIG. 11B shows a detailed view of the exemplary embodiment of FIG. 11A.
Figure 12A:
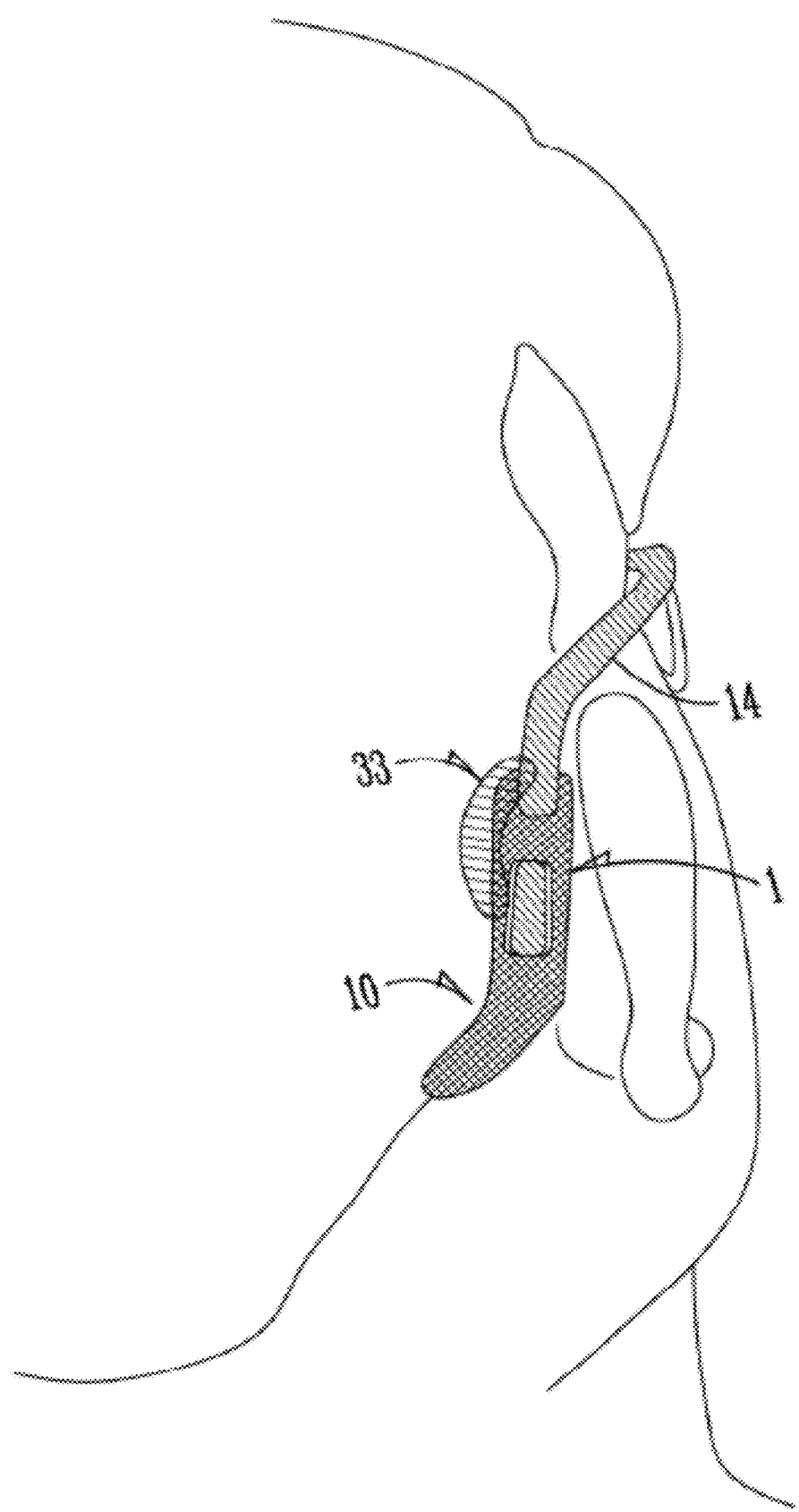
FIG. 12A shows the exemplary embodiment of a combined hearing aid and/or eyeglasses retainer device as shown in FIG. 1 attached to temple of eyeglasses in a different position than that of FIG. 11A.
Figure 12B:
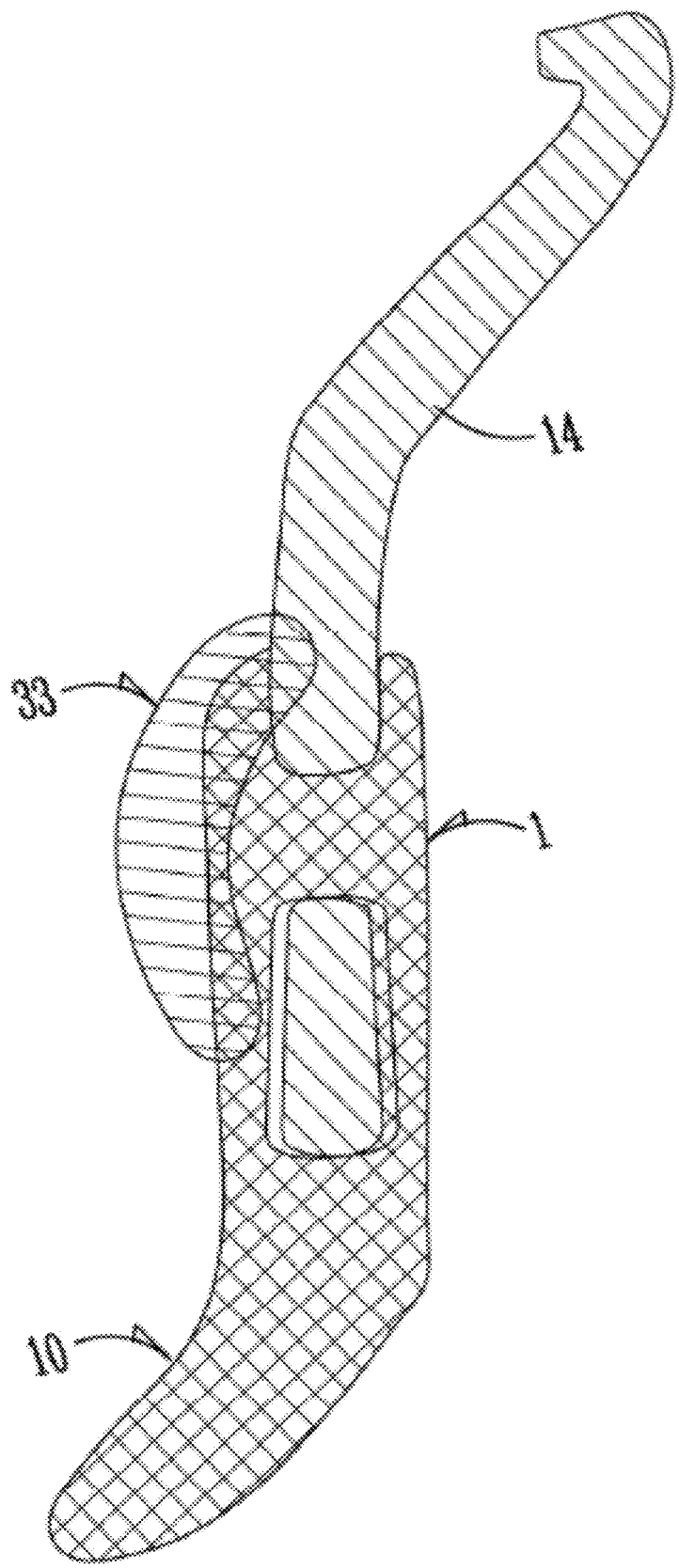
FIG. 12B shows a detailed view of the exemplary embodiment of FIG. 12A.

FIGS. 11A, 11B, 12A, and 12B show an exemplary embodiment of a combined hearing aid and/or eyeglasses retainer device 1 attached to temple 14 of eyeglasses positioned on the ear of a user lateral to a BTE hearing aid housing 33, and the medial curved flap 10 of device 1 contacting user's head. The exact positioning of the device 1 can vary as long as it can contact the housing 33. FIGS. 11A-B show the BTE housing 33 juxtaposed medially to the retention device 1 in one location and FIGS. 12-12B show the BTE housing 33 juxtaposed medially to the retention device 1 in a second location.

The devices 1, 20 do not dislodge BTE hearing aid housings 33 when eyeglasses with attached devices 1, 20, are moved off a user's ears. This is in part because the flap(s) 10, 23 may be designed with a thin wall to brush lightly off the housing(s) 33.

This one-part single unit BTE hearing aid retention device(s) 1, 20 eliminates the need for multiple components seen with prior art and is compatible with various sizes and shapes of eyeglasses temples and BTE hearing aids made by different manufacturers. The devices 1, 20 are ideally manufactured as a one-part single unit to enhance manufacturability and reduce costs. However, it is possible to manufacture them from more than one-part and then later assemble them into a single unit.

Depending on the size of the temple end(s), the user can choose to push the temple end(s) 14 under one strap 6 to attach and hold device 1 on the temple(s) 14 or strap 21 to attach and hold device 20 on the temples 14. When the eyeglasses are placed on the user's ears and head, the flaps 10 of device 1 will contact the back of the user's head or flaps 23 of device 20 will contact the posterior surfaces of the user's ears. Hence, the retention means of devices 1 and 20 each have stabilizing means comprised of two-point locations, namely the straps 6 or 21 respectively and the position of the flaps 10, 23 respectively. Each of the stabilizing two-point locations (6 and 10) or (21 and 23) are separated longitudinally to enhance stabilizing the devices 1, 20 so that the eyeglasses can be retained on the user's head. Moreover if the user has thin or wire framed temples they can choose the two straps 6, 6' for device 1, or strap 21 with one of the two slits 29, 29' for device 20, and in combination with flaps 10, 23 respectively provide a three-point stabilizing means for retention of devices 1 and 20. Each of the stabilizing three-point locations (6, 6' and 10) or (21, 29 or 29', and 23) are separated longitudinally to enhance stabilizing the devices 1, 20 so that the eyeglasses can be retained on the user's head.

The combined hearing aid and/or eyeglasses retention device(s) 1, 20 is also standalone eyeglasses retention device(s), otherwise also referred to as an eyeglasses retention device, when the user is not wearing hearing aids. In other words, it has the same elements as the combined hearing aid and/or eyeglasses retention device(s) 1, 20. The illustrations for the eyeglass retention device are the same as devices 1 and 20 with corresponding strap(s) 6, 6' noted for device 1, or strap 21 and slits 29 or 29' for device 20 The straps 6, 6' for device 1 or strap 21 and slits 29, or 29' for device 20 provide structures for securely attaching and holding devices 1 or 20 onto temples at one or two distinct points on eyeglasses temple(s) 14. Alternatively, the eyeglasses retention device(s) can have one long strap (not shown) located on the external sides 4, 28 respectively of devices 1, 20 with apertures at the anterior end and posterior end of the devices 1, 20. In this example the posterior end of the temple 14 would be pushed through an anterior aperture, then traverse tunneled under the longer strap until it emerges through the posterior aperture back onto the exterior side of the device. That would provide another means for attaching and holding the devices 1, 20 securely to the temples 14 and stabilize the eyeglasses retention devices onto the temples 14.

The eyeglass device(s) 1, 20 by being manufactured as a one-part single unit eliminates the need for multiple components seen with prior art and it is also compatible with various sizes and shapes of eyeglasses temples made by different manufacturers. The devices 1, 20 are ideally manufactured as a one-part single unit to enhance manufacturability and reduce costs. However, it is possible to manufacture them from more than one part and then assemble them into a single unit.

The eyeglasses retention device 1, 20 has the same movability corresponding to the combined hearing aid and/or eyeglasses retention device(s) 1, 20. It can maintain ideal positioning and retention of the user's eyeglasses for optimal visual acuity by moving the devices 1, 20 on the temple 14 in unrestricted directions; anteriorly, posteriorly, medially or laterally as needed, so that devices 1, 20 can be positioned on the temple 14 to allow the medial curved flap(s) 10 of devices 1, or lateral curved flap 23 of device 20 to directly contact or be in close proximity to the surface(s) of the user's head or pinnae respectively. Both curved flaps 10 and 23 can be manufactured pre-formed at an angle close to or near 45 degrees in reference to the longitudinal axis 13, although any angle that allows the flaps 10, 23 to contact the user's head or pinnae respectively for eyeglass retention is acceptable. The length of the flaps 10, 23 can be extended posteriorly, FIG. 13, so there is adequate purchase of the devices 1, 20 to contact the user's head or pinnae respectively to retain eyeglasses in place. It is understood that flap(s) 10, 23 can be any shape that can function to retain eyeglasses in place.

As with the combination hearing aid retention and/or eyeglasses retention device, the eyeglass retention device can be used with temples of different sizes. Depending on the size of the temple end(s), (such as 5 mm or greater in height) the user can choose to push the temple end(s) 14 under one strap 6 to attach and hold device 1 on the temple(s) 14 or strap 21 to attach and hold device 20 on the temples 14. When the eyeglasses are placed on the user's ears and head, the flaps 10 of device 1 will contact the back of the user's head or flaps 23 of device 20 will contact the posterior surfaces of the user's ears. Hence, the retention means of devices 1 and 20 each have stabilizing means comprised of two-point locations, namely the straps 6 or 21 respectively with the position of the flaps 10, 23 respectively. Each of the stabilizing two-point locations (6 and 10) or (21 and 23) are separated longitudinally to enhance stabilizing the devices 1, 20 so that the eyeglasses can be retained on the user's head. Moreover if the user has thin or wire framed temples they can choose the two straps 6, 6' for device 1, or strap 21 with one of two slits 29, 29' for device 20, and in combination with flaps 10, 23 respectively provide a three-point stabilizing means for retention of devices 1 and 20. Each of the stabilizing three-point locations (6, 6' and 10) or (21, 29 or 29', and 23) are separated longitudinally to enhance stabilizing the devices 1, 20 so that the eyeglasses can be retained on the user's head.

Either device(s) 1, 20 for an eyeglasses retention device can be combined with a lanyard in the event a user wants to retain their eyeglasses once removed from their head. The posterior ends of the flaps 10, 23 can be reduced in circumference so that tethers of a commercial lanyard can be directly connected to them. Additionally, the devices 1, 20, can have a protrusion for attachment of a commercially available lanyard. This then allows the eyeglass retention devices 1, 20 to be manufactured so that commercial existing lanyards can be attached to ends of devices 1, 20. The devices 1, 20 can also be manufactured with another structure to permit attachment of a lanyard. One structure to attach a lanyard to either of the device(s) 1, 20 includes a hole(s) 39, FIG. 14, in the devices 1, 20 wherein a rope (not shown) can be pushed through the holes 39 located on flaps 10, 23 of either pair of the devices 1, 20 respectively. The ends of the rope would have a larger diameter than the holes 39 so that the rope is retained when forced through the holes 39; however, the user can reversibly remove the rope from the device(s) 1, 20 by forces that can stretch the holes 39 to allow removal of the rope. Additionally, there can be a horizontal slit 40, FIG. 15, emanating 270 degrees from the hole 39 towards the anterior ends 2, 24 of devices 1, 20 respectively 1, 20 that can permit the user to push the rope into the hole 39. The slit 40 also permits the user to remove the rope from attachment to the devices 1, 20. The holes 39 can be situated any place convenient for the comfort of the user and functionality of the devices 1, 20. An ideal location would be on the superior-posterior ends of the flap(s) 10, 23, FIG. 14, 15. The tethers of commercial lanyards can also be placed on the posterior ends of eyeglass temples 14 when the devices 1, 20 are attached to the temples 14. Lastly, a lanyard can also be manufactured as a single unit as part of the devices 1, 20.

The devices 1, 20 functioning as combined hearing aid and/or eyeglasses retention devices have elements that could be added to manufactured eyeglasses. For example, the curved medial 10 or lateral flaps 23 could be included as moveable elements in manufactured eyeglasses temples to obtain optimal adjustment and positioning of flaps for eyeglass retention. It is understood that flaps 10, 23 can be any shape or size as long as they function to retain eyeglasses on the users head. Additionally, the medial side(s) 9, 27 for devices 1, 20 respectively could be added to manufactured eyeglass temples for hearing aid retention.

The material for this device can be molded with thermoplastics elastomers or silicone but other materials may be used by those familiar in the art. A clinginess, tackiness, purchase, or adhesive substance can be applied to the medial side to reduce slippage between the medial side of the hearing aid retainers and the hearing aid housings.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. The use of the prime (') symbol denotes use of a similar element. For example, a reference character without a prime can refer to a right-side element while the reference character with the prime symbol can refer to a left side element. If possible, elements identified by a reference character can replace or supplement any element identified by another reference character.

TABLE 1

| List of Reference Characters | |
|---|---|
| 1 | BTE hearing aid-eyeglasses retention device |
| 2 | Front (anterior) end or border of device |
| 3 | Back (posterior) end or border of device |
| 4 | External side of device |
| 5 | Groove on external side |
| 6 | Anterior strap on external side |
| 6' | Second strap posterior to strap 6 |
| 7 | Aperture located anterior to strap 6 |
| 8 | Second aperture located just posterior to strap 6' |
| 9 | Medial side of device |
| 10 | Medial curved flap |
| 11 | Inferior border of device |
| 11' | Inferior border of device 20 |
| 12 | Superior border of device |
| 12' | Superior border for device 20 |
| 13 | Longitudinal axis of device |
| 14 | Section of eyeglasses temple |
| 16 | Wall of the device |
| 17, 17' | Apertures located on both sides of strap 6 |
| 18 | Protrusion located on the external side of second embodiment of device |
| 20 | Second embodiment of combined hearing aid and/or eyeglasses retention device |
| 21 | Strap |
| 22, 22' | Apertures on both sides of strap of device |
| 23 | Lateral curved flap on posterior end of device |
| 24 | Anterior end |
| 25 | Posterior end |
| 26 | Wall component |
| 27 | Medial side |
| 28 | External side |
| 29, 29' | Slits on posterior end |
| 30 | BTE hearing aid |
| 31 | Ear bud surrounding the speaker-receiver |
| 32 | Speaker-receiver |
| 33 | Curved housing of BTE hearing device |
| 34 | Flexible tube with wires |
| 35 | Flexible retainer strip |
| 36 | Microphone ports |
| 37 | Volume buttons |
| 38 | Battey compartment |
| 39 | Hole in flap 10 |
| 40 | Horizontal slit in hole 39 |
| 41 | Ribs |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible combination of any of the aspects of any of the embodiments disclosed to result in additional embodiments, combinations, sub-combinations, or the like that would be obvious to those skilled in the art.

The invention claimed is:

1. An accessory eyeglasses retention device, integrally formed as a single piece, to secure eyeglasses to a wearer's head, the accessory eyeglasses retention device comprising:
   an elongated body extending between a front end and a back end;
   an adjustment mechanism including a first elastic strap carried on the elongated body and defined between first and second apertures in the elongated body and configured to attach to and hold a temple of the eyeglasses within the first and second apertures and tunneled under the first elastic strap, and adjustably position the elongated body relative to the temple; and
   an angled flap at the back end of the elongated body, extending and angled in a direction towards a portion of the wearer's head when the eyeglasses are worn on the wearer's head, and configured to securely retain the eyeglasses in a desired location on the wearer's head.

2. The accessory eyeglasses retention device according to claim 1, further comprising a lanyard attachment feature associated with the elongated body and configured to attach the elongated body to an eyeglasses lanyard.

3. The accessory eyeglasses retention device according to claim 2, wherein the lanyard attachment feature comprises a stretchable opening within the back end of the elongated body and configured to detachably receive an end of the eyeglasses lanyard.

4. The accessory eyeglasses retention device according to claim 3, wherein the lanyard attachment feature further comprises a lanyard slit extending outwardly from an edge of the stretchable opening and configured to slidably receive the end of the eyeglasses lanyard.

5. The accessory eyeglasses retention device according to claim 1, wherein the angled retainer comprises a medial curved flap.

6. The accessory eyeglasses retention device according to claim 5, wherein the adjustment mechanism is configured to adjustably position the elongated body relative to the temple so that the medial curved flap contacts a surface of the wearer's head or is in close proximity to the surface of a wearer's head.

7. The accessory eyeglasses retention device according to claim 1, wherein the angled retainer comprises a lateral curved flap.

8. The accessory eyeglasses retention device according to claim 7, wherein the adjustment mechanism is configured to adjustably position the elongated body relative to the temple so that the lateral curved flap contacts a posterior surface of the wearer's ear or is in close proximity to the posterior surface of the wearer's ear.

9. The accessory eyeglasses retention device according to claim 1, wherein the adjustment mechanism further includes a second elastic strap positioned on the elongated body and also configured to hold the temple of the eyeglasses and adjustably position the elongated body relative to the temple.

10. The accessory eyeglasses retention device according to claim 9, wherein the adjustment mechanism is further configured to adjust an angle of the angled flap, with selective use of the first elastic strap and the second elastic strap, for contact with, or to be in close proximity with, a posterior surface of the wearer's ear.

11. The accessory eyeglasses retention device according to claim 9, wherein the first elastic strap, second elastic strap and angled flap together define a three-point contact stabilizer configured to stabilize the eyeglasses on the wearer's head.

12. The accessory eyeglasses retention device according to claim 1, wherein the first elastic strap and angled flap together define a two-point contact stabilizer configured to stabilize the eyeglasses on the wearer's head.

13. An accessory eyeglasses retention device, integrally formed as a single elastomeric piece, to secure eyeglasses to a wearer's head, the accessory eyeglasses retention device comprising:
   an elongated body extending between a front end and a back end;
   an adjustment mechanism including a first elastic strap defined between apertures in the elongated body and configured to hold a temple of the eyeglasses within the apertures and tunneled under the first elastic strap, and adjustably position the elongated body relative to the temple;
   an angled flap at the back end of the elongated body, extending and angled in a direction towards a portion of the wearer's head when the eyeglasses are worn on the wearer's head, and configured to securely retain the eyeglasses in a desired location on the wearer's head; and
   a lanyard attachment feature at the back end of the elongated body and configured to attach the elongated body to an eyeglasses lanyard.

14. The accessory eyeglasses retention device according to claim 13, wherein the lanyard attachment feature comprises a stretchable opening within the back end of the elongated body and configured to detachably receive an end of the eyeglasses lanyard.

15. The accessory eyeglasses retention device according to claim 14, wherein the lanyard attachment feature further comprises a lanyard slit extending outwardly from an edge of the stretchable opening and configured to slidably receive the end of the eyeglasses lanyard.

16. The accessory eyeglasses retention device according to claim 13, wherein the angled flap comprises a medial curved flap; and wherein the adjustment mechanism is configured to adjustably position the elongated body relative to the temple so that the medial curved flap contacts a surface of the wearer's head or is in close proximity to the surface of a wearer's head.

17. The accessory eyeglasses retention device according to claim 13, wherein the angled flap comprises a lateral curved flap; and wherein the adjustment mechanism is configured to adjustably position the elongated body relative to the temple and to adjust an angle of the lateral curved flap so that the lateral curved flap contacts a posterior surface of the wearer's ear or is in close proximity to the posterior surface of a wearer's ear.

18. The accessory eyeglasses retention device according to claim 13, wherein the adjustment mechanism further comprises a second elastic strap and is further configured to adjust an angle of the angled flap, with selective use of the first and second elastic straps, for contact with the portion of the wearer's head.

19. The accessory eyeglasses retention device according to claim 18, wherein the first elastic strap, second elastic strap and angled flap together define a three-point contact stabilizer configured to stabilize the eyeglasses on the wearer's head; and wherein the first elastic strap and angled flap together define a two-point contact stabilizer configured to stabilize the eyeglasses on the wearer's head.

20. The accessory eyeglasses retention device according to claim 13, further comprising at least one rib extending medially from a top edge of the elongate body and configured to retain a behind-the-ear (BTE) housing of a hearing aid device on the wearer's ear.

* * * * *